US012784232B2

(12) United States Patent
Sha et al.

(10) Patent No.: US 12,784,232 B2
(45) Date of Patent: Nov. 3, 2026

(54) SYSTEM, METHOD AND NON-TRANSITORY COMPUTER-READABLE MEDIUM FOR GENERATING TRACKABLE VIDEO FRAMES FROM BROADCAST VIDEO

(71) Applicant: Stats LLC, Chicago, IL (US)

(72) Inventors: Long Sha, Chicago, IL (US); Sujoy Ganguly, Chicago, IL (US); Xinyu Wei, Melbourne (AU); Patrick Joseph Lucey, Chicago, IL (US); Aditya Cherukumudi, London (GB)

(73) Assignee: Stats LLC, Chicago, IL (US)

( * ) Notice: Subject to any disclaimer, the term of this patent is extended or adjusted under 35 U.S.C. 154(b) by 0 days.

(21) Appl. No.: 18/514,326

(22) Filed: Nov. 20, 2023

(65) Prior Publication Data

US 2024/0087138 A1 Mar. 14, 2024

Related U.S. Application Data

(63) Continuation of application No. 17/810,457, filed on Jul. 1, 2022, now Pat. No. 11,861,848, which is a (Continued)

(51) Int. Cl.
*G06T 7/20* (2017.01)
*G06F 18/2135* (2023.01)
(Continued)

(52) U.S. Cl.
CPC ............ *G06T 7/20* (2013.01); *G06F 18/2135* (2023.01); *G06F 18/214* (2023.01); *G06F 18/22* (2023.01);
(Continued)

(58) Field of Classification Search
CPC .... G06T 7/20; G06T 7/70; G06T 7/73; G06T 7/80; G06T 7/97; G06T 2207/10016;
(Continued)

(56) References Cited

U.S. PATENT DOCUMENTS

| | | | | |
|---|---|---|---|---|
| 8,199,199 | B1 | 6/2012 | Shlyak et al. | |
| 8,279,286 | B2 * | 10/2012 | Wagg ..................... | G11B 27/28 348/157 |

(Continued)

FOREIGN PATENT DOCUMENTS

| | | | |
|---|---|---|---|
| CN | 101686350 | A | 3/2010 |
| CN | 102110293 | A | 6/2011 |

(Continued)

OTHER PUBLICATIONS

Ahmed, et al., "An improved deep learning architecture for person re-identification", Proceedings of the IEEE conference on computer vision and pattern recognition, pp. 3908-3916, 2015.

(Continued)

*Primary Examiner* — Kathleen Y Dulaney
(74) *Attorney, Agent, or Firm* — Bookoff McAndrews, PLLC

(57) ABSTRACT

A system and method of generating trackable frames from a broadcast video feed are provided herein. A computing system retrieves a broadcast video feed for a sporting event. The broadcast video feed includes a plurality of video frames. The computing system generates a set of frames for classification using a principal component analysis model. The set of frames are a subset of the plurality of video frames. The computing system partitions each frame of the set of frames into a plurality of clusters. The computing system classifies each frame of the plurality of frames as trackable or untrackable. Trackable frames capture a unified view of the sporting event. The computing system compares each cluster to a predetermined threshold to determine whether each cluster comprises at least a threshold number of trackable frames. The computing system classifies each cluster that includes at least the threshold number of trackable frames as trackable.

20 Claims, 13 Drawing Sheets

Related U.S. Application Data continuation of application No. 16/805,116, filed on Feb. 28, 2020, now Pat. No. 11,379,683.

(60) Provisional application No. 62/811,889, filed on Feb. 28, 2019.

(51) Int. Cl.

| | |
|---|---|
| ***G06F 18/214*** | (2023.01) |
| ***G06F 18/22*** | (2023.01) |
| ***G06F 18/2413*** | (2023.01) |
| ***G06N 3/08*** | (2023.01) |
| ***G06T 7/00*** | (2017.01) |
| ***G06T 7/70*** | (2017.01) |
| ***G06T 7/73*** | (2017.01) |
| ***G06T 7/80*** | (2017.01) |
| ***G06V 10/44*** | (2022.01) |
| ***G06V 10/764*** | (2022.01) |
| ***G06V 10/82*** | (2022.01) |
| ***G06V 20/40*** | (2022.01) |
| ***G06V 40/20*** | (2022.01) |
| ***H04N 21/44*** | (2011.01) |

(52) U.S. Cl.

CPC .......... *G06F 18/2413* (2023.01); *G06N 3/08* (2013.01); *G06T 7/70* (2017.01); *G06T 7/73* (2017.01); *G06T 7/80* (2017.01); *G06T 7/97* (2017.01); *G06V 10/454* (2022.01); *G06V 10/764* (2022.01); *G06V 10/82* (2022.01); *G06V 20/42* (2022.01); *G06V 20/46* (2022.01); *G06V 20/48* (2022.01); *G06V 20/49* (2022.01); *G06V 40/20* (2022.01); *H04N 21/44008* (2013.01); *G06T 2207/10016* (2013.01); *G06T 2207/20081* (2013.01); *G06T 2207/20084* (2013.01); *G06T 2207/30221* (2013.01); *G06T 2207/30244* (2013.01); *G06V 20/44* (2022.01)

(58) Field of Classification Search

CPC . G06T 2207/20081; G06T 2207/20084; G06T 2207/30221; G06T 2207/30244; G06T 7/246; G06F 18/2135; G06F 18/214; G06F 18/22; G06F 18/2413; G06N 3/08; G06N 3/045; G06N 3/088; G06V 10/454; G06V 10/764; G06V 10/82; G06V 20/42; G06V 20/46; G06V 20/48; G06V 20/49; G06V 40/20; G06V 20/44; G06V 10/7715; H04N 21/44008; H04N 21/23418; H04N 21/2353; H04N 21/26603; H04N 21/84; H04N 21/8456; H04N 21/8455

USPC .................................. 382/103; 348/157, 169

See application file for complete search history.

(56) References Cited

U.S. PATENT DOCUMENTS

| | | | |
|---|---|---|---|
| 8,705,793 | B2 | 4/2014 | Nevatia et al. |
| 8,854,457 | B2 * | 10/2014 | De Vleeschouwer . H04N 5/262 348/135 |
| 9,202,523 | B2 | 12/2015 | Ryu et al. |
| 9,495,600 | B2 | 11/2016 | Heu et al. |
| 9,600,723 | B1 | 3/2017 | Pantofaru et al. |
| 9,600,760 | B2 | 3/2017 | Essa et al. |
| 9,743,014 | B2 | 8/2017 | Tate et al. |
| 9,883,163 | B2 | 1/2018 | Carr et al. |
| 9,886,624 | B1 * | 2/2018 | Marty .................... G06V 40/23 |
| 10,007,862 | B2 | 6/2018 | Gurwicz et al. |
| 10,089,556 | B1 | 10/2018 | Xu |
| 10,096,114 | B1 * | 10/2018 | Lasenby ................. G06T 7/246 |
| 10,269,120 | B2 | 4/2019 | Kao et al. |
| 10,402,687 | B2 | 9/2019 | Anthony et al. |
| 10,460,176 | B2 | 10/2019 | Chang et al. |
| 10,467,478 | B2 | 11/2019 | Chen et al. |
| 10,474,992 | B2 | 11/2019 | Fisher et al. |
| 10,503,775 | B1 | 12/2019 | Ranzinger et al. |
| 10,521,691 | B2 | 12/2019 | Najibikohnehshahri et al. |
| 10,659,769 | B2 | 5/2020 | Mizuno |
| 10,713,543 | B1 * | 7/2020 | Skuin ..................... G06N 3/045 |
| 10,719,712 | B2 | 7/2020 | Gupta et al. |
| 10,726,312 | B2 | 7/2020 | Butt et al. |
| 10,726,358 | B2 | 7/2020 | Howell |
| 10,740,620 | B2 | 8/2020 | Vijayanarasimhan et al. |
| 10,803,602 | B2 | 10/2020 | Kim et al. |
| 10,824,918 | B2 * | 11/2020 | Felsen .................... G06V 20/49 |
| 10,970,551 | B2 | 4/2021 | Iwamoto et al. |
| 11,006,089 | B2 | 5/2021 | Arai |
| 11,176,411 | B2 | 11/2021 | Sha et al. |
| 11,182,642 | B2 | 11/2021 | Sha et al. |
| 11,232,294 | B1 | 1/2022 | Banerjee et al. |
| 11,348,252 | B1 | 5/2022 | Moss et al. |
| 11,386,306 | B1 | 7/2022 | Siddiquie et al. |
| 11,521,388 | B2 | 12/2022 | Ueda et al. |
| 2003/0095186 | A1 * | 5/2003 | Aman ................ A63B 24/0021 348/169 |
| 2003/0179294 | A1 * | 9/2003 | Martins ................... G06T 7/292 348/157 |
| 2004/0130567 | A1 | 7/2004 | Ekin et al. |
| 2004/0143434 | A1 | 7/2004 | Divakaran et al. |
| 2004/0146182 | A1 | 7/2004 | Mostert et al. |
| 2005/0277466 | A1 * | 12/2005 | Lock ...................... H04N 23/90 463/30 |
| 2006/0024041 | A1 | 2/2006 | Lou et al. |
| 2007/0250465 | A1 | 10/2007 | Moden |
| 2008/0192116 | A1 | 8/2008 | Tamir et al. |
| 2009/0059007 | A1 * | 3/2009 | Wagg ................... G11B 27/105 348/157 |
| 2009/0141933 | A1 * | 6/2009 | Wagg ..................... G06V 40/25 382/100 |
| 2010/0290705 | A1 | 11/2010 | Nakamura et al. |
| 2011/0187827 | A1 * | 8/2011 | Porter .................. H04N 13/128 348/46 |
| 2011/0242326 | A1 * | 10/2011 | Essa ....................... G06N 3/006 348/157 |
| 2012/0180084 | A1 * | 7/2012 | Huang ................. H04N 5/2224 725/32 |
| 2012/0316843 | A1 | 12/2012 | Beno et al. |
| 2013/0176392 | A1 * | 7/2013 | Carr .......................... G06T 7/85 348/43 |
| 2013/0182119 | A1 * | 7/2013 | Eledath ................... G06T 7/215 348/207.11 |
| 2013/0263166 | A1 | 10/2013 | Fleischman |
| 2014/0037213 | A1 | 2/2014 | Niederberger et al. |
| 2014/0270500 | A1 | 9/2014 | Li et al. |
| 2014/0270501 | A1 | 9/2014 | Emeott |
| 2014/0333775 | A1 | 11/2014 | Naikal et al. |
| 2015/0066448 | A1 | 3/2015 | Liu et al. |
| 2015/0125032 | A1 | 5/2015 | Yamanaka et al. |
| 2015/0125042 | A1 | 5/2015 | Haden et al. |
| 2015/0312354 | A1 | 10/2015 | Boyle et al. |
| 2015/0347918 | A1 * | 12/2015 | Lucey ...................... G06N 7/01 706/12 |
| 2015/0350606 | A1 | 12/2015 | Khanfor |
| 2015/0363933 | A1 | 12/2015 | Jung et al. |
| 2016/0019428 | A1 | 1/2016 | Renner et al. |
| 2016/0101358 | A1 * | 4/2016 | Ibrahim .................. G06T 7/292 463/31 |
| 2017/0024626 | A1 | 1/2017 | Inaba et al. |
| 2017/0091413 | A1 | 3/2017 | Kondo et al. |
| 2017/0178688 | A1 | 6/2017 | Ricciardi |
| 2017/0238055 | A1 * | 8/2017 | Chang .................... G06V 20/42 725/19 |
| 2017/0255826 | A1 | 9/2017 | Chang et al. |
| 2017/0255827 | A1 | 9/2017 | Chang et al. |
| 2017/0255828 | A1 | 9/2017 | Chang et al. |
| 2017/0255829 | A1 | 9/2017 | Chang et al. |
| 2017/0256065 | A1 | 9/2017 | Wu et al. |

(56) References Cited

U.S. PATENT DOCUMENTS

2018/0035076 A1 2/2018 Arai et al.
2018/0045568 A1* 2/2018 Kim ...................... G01J 3/0229
2018/0075593 A1* 3/2018 Wang ................... G06V 40/103
2018/0139425 A1 5/2018 Mutter et al.
2018/0167522 A1 6/2018 Kunieda et al.
2018/0181569 A1 6/2018 Jarr et al.
2018/0189325 A1 7/2018 Hohwald et al.
2018/0197296 A1 7/2018 Liu et al.
2018/0330238 A1 11/2018 Luciw et al.
2018/0336704 A1* 11/2018 Javan Roshtkhari ..... G06T 7/80
2018/0342068 A1 11/2018 Hasejima et al.
2018/0350084 A1* 12/2018 Tamir ...................... G06T 7/292
2018/0373744 A1 12/2018 Mccord et al.
2019/0012574 A1 1/2019 Anthony et al.
2019/0023395 A1 1/2019 Lee et al.
2019/0108631 A1 4/2019 Riley et al.
2019/0114485 A1 4/2019 Chan et al.
2019/0114487 A1 4/2019 Vijayanarasimhan et al.
2019/0158746 A1* 5/2019 Besley .................... G06T 7/337
2019/0182436 A1 6/2019 Gupta et al.
2019/0188866 A1 6/2019 Mehrseresht
2019/0205651 A1 7/2019 Chang et al.
2019/0222776 A1 7/2019 Carter et al.
2019/0251204 A1 8/2019 Bedadala
2019/0266407 A1 8/2019 Gupta et al.
2019/0304076 A1* 10/2019 Nina Paravecino ...... G06T 7/11
2019/0325638 A1* 10/2019 Lucas ....................... G06T 7/55
2019/0335192 A1 10/2019 Otto et al.
2019/0371080 A1 12/2019 Sminchisescu et al.
2019/0377345 A1* 12/2019 Bachrach .............. G06V 40/23
2019/0392219 A1 12/2019 Chang et al.
2020/0012861 A1 1/2020 Chan et al.
2020/0013156 A1 1/2020 Weiss et al.
2020/0021745 A1 1/2020 Ogura
2020/0036895 A1 1/2020 Midorikawa et al.
2020/0043287 A1* 2/2020 Zhang .................... G06V 20/52
2020/0051282 A1 2/2020 Watanabe et al.
2020/0074182 A1 3/2020 Chang et al.
2020/0202371 A1 6/2020 Mayster et al.
2020/0218902 A1 7/2020 Chang et al.
2020/0234497 A1 7/2020 Fueki et al.
2020/0279114 A1 9/2020 Sha et al.
2020/0279115 A1 9/2020 Sha et al.
2020/0279398 A1 9/2020 Sha et al.
2020/0311392 A1 10/2020 Mande et al.
2020/0311395 A1 10/2020 Kim et al.
2020/0311433 A1* 10/2020 Oz ......................... G06N 20/00
2021/0118182 A1 4/2021 Avnat et al.
2021/0133944 A1 5/2021 Sakakima
2021/0158526 A1 5/2021 Patil et al.
2021/0233326 A1* 7/2021 Li ............................ G06T 7/74
2021/0240992 A1 8/2021 Chan et al.
2021/0264141 A1 8/2021 Chojnacki
2022/0084315 A1 3/2022 Onozato et al.
2022/0129669 A1 4/2022 Devassy et al.
2022/0284628 A1 9/2022 Tuxen et al.
2022/0327830 A1 10/2022 Chang et al.
2024/0185378 A1* 6/2024 Sha ........................... G06T 3/00

FOREIGN PATENT DOCUMENTS

CN 102612707 B 8/2014
CN 105653700 A 6/2016
CN 107871120 A 4/2018
CN 107924572 A 4/2018
CN 107944431 A 4/2018
CN 108399435 A 8/2018
CN 108629791 A 10/2018
CN 108875667 A 11/2018
JP 2005115529 A 4/2005
WO 2006103662 A2 10/2006
WO 2017103674 A1 6/2017
WO 2017210564 A1 12/2017
WO 2018053257 A1 3/2018
WO 2018/177134 A1 10/2018
WO 2019244153 A1 12/2019

OTHER PUBLICATIONS

Arbuús-Sangüesa, et al., "Single-camera basketball tracker through pose and semantic feature fusion." arXiv preprint arXiv:1906.02042 (2019).

Bedagkar-Gala, et al., "Part-based spatio-temporal model for multi-person re-identification", Pattern Recognition Letters 33.14, pp. 1908-1915, 2012.

Bertini, et al., "Matching faces with textual cues in soccer videos," 2006 IEEE international conference on multimedia and expo, IEEE, 2006.

Bhattacharyya, "On a measure of divergence between two multinomial populations", Sankhyā: the Indian journal of statistics, pp. 401-406, 1946.

Cao, et al., "Realtime multi-person 2D pose estimation using part affinity fields", Proceedings of the IEEE Conference on Computer Vision and Pattern Recognition, pp. 7291-7299, 2017.

Carr, et al., "Point-less calibration: Camera parameters from gradient-based alignment to edge images", 2012 IEEE Workshop on the Applications of Computer Vision (WACV), 2012.

Chan, et al., "Player identification in hockey broadcast videos," Expert Systems with Applications 165, 2021, 9 pages.

Chen, et al., "A two-point method for PTZ camera calibration in sports," 2018 IEEE Winter Conference on Applications of Computer Vision (WACV), 2018, pp. 287-295.

Chen, et al., "Mimicking human camera operators", 2015 IEEE Winter Conference on Applications of Computer Vision, 2015.

Corvee, et al., "Person re-identification using spatial covariance regions of human body parts", 2010 7th IEEE International Conference on Advanced Video and Signal Based Surveillance, Aug. 2010.

Csurka, et al., "Visual Categorization with Bags of Keypoints", In Workshop on statistical learning in computer vision, ECCV, V.1, 2004.

D'Angelo, et al., "People re-identification in camera networks based on probabilistic color histograms", Visual Information Processing and Communication II. vol. 7882. International Society for Optics and Photonics, 2011.

Donahue, et al., "Long-term recurrent convolutional networks for visual recognition and description", Proceedings of the IEEE conference on computer vision and pattern recognition, pp. 2625-2634, 2015.

Eisenbach, et al., "View invariant appearance-based person reidentification using fast online feature selection and score level fusion", IEEE Ninth International Conference on Advanced Video and Signal-Based Surveillance, pp. 184-190, 2012.

Farenzena, et al., "Person re-identification by symmetry-driven accumulation of local features", IEEE Computer Society Conference on Computer Vision and Pattern Recognition, 2010.

Fischler, et al., "Random sample consensus: a paradigm for model fitting with applications to image analysis and automated cartography", Communications of the ACM 24.6, pp. 381-395, 1981.

Forgy, "Cluster Analysis of Multivariate Data: Efficiency versus Interpretability of Classifications", Biometrics, 21, pp. 768-769, 1965.

Gerke, et al., "Soccer jersey No. recognition using convolutional neural networks", Proceedings of the IEEE International Conference on Computer Vision Workshops, Feb. 15, 2016, pp. 17-24.

Gheissari, et al., "Person reidentification using spatiotemporal appearance", IEEE Computer Society Conference on Computer Vision and Pattern Recognition (CVPR'06), vol. 2, 2006.

Guantian L., et al., "Physicochemical Properties of Quinoa Starch," Carbohydrate Polymers, Applied SciencePublishers, LTD Barking, GB, Oct. 17, 2015, vol. 137, pp. 328-338.

Guantian L., et al., "Quinoa starch: Structure, Properties, and Applications," Carbohydrate Polymers, AppliedScience Publishers, LTD Barking, GB, Nov. 23, 2017, vol. 181, pp. 851-861.

(56) References Cited

OTHER PUBLICATIONS

Hu et al, Online Photometric Calibration of Optical Flow Visual-Inertial SLAM system,. 2020 12th international conference on Communication SOftware and Networks, pp. 13-17 (Year: 2020).
International Preliminary Report on Patentability for International Application No. PCT/US2020/020438, mailed Sep. 10, 2021, 20 Pages.
International Preliminary Report on Patentability for International Application No. PCT/US2020/020442, mailed Sep. 10, 2021, 6 Pages.
International Preliminary Report on Patentability for International Application No. PCT/US2020/020444, mailed Sep. 10, 2021, 6 Pages.
International Preliminary Report on Patentability for International Application No. PCT/US2020/020446, mailed Sep. 10, 2021, 5 Pages.
International Search Report and Written Opinion for International Application No. PCT/US2020/020438, mailed May 19, 2020, 21 Pages.
International Search Report and Written Opinion for International Application No. PCT/US2020/020442, mailed May 7, 2020, 7 Pages.
International Search Report and Written Opinion for International Application No. PCT/US2020/020444, mailed May 7, 2020, 7 Pages.
International Search Report and Written Opinion for International Application No. PCT/US2020/020446, mailed Jun. 4, 2020, 6 Pages.
Ji, et al., "3D convolutional neural networks for human action recognition", IEEE transactions on pattern analysis and machine intelligence 35.1, 2013.
Karpathy, et al., "Large-scale video classification with convolutional neural networks", Proceedings of the IEEE conference on Computer Vision and Pattern Recognition, 2014.
Kawai, et al., "Person re-identification using view-dependent score-level fusion of gait and color features", Proceedings of the 21st International Conference on Pattern Recognition (ICPR2012), IEEE, pp. 2694-2697, Nov. 2012.
Khan, et al., "Appearance-based re-identification of people in video", International Conference on Digital Image Computing: Techniques and Applications, IEEE, pp. 357-362, 2010.
Li, et al. "Deepreid: Deep filter pairing neural network for person re-identification", Proceedings of the IEEE conference on computer vision and pattern recognition, 2014.
Liu, et al., "Extracting story units in sports video based on unsupervised video scene clustering," 2006 IEEEInternational Conference on Multimedia and Expo. IEEE, 2006, pp. 1605-1608.
Lloyd, "Least squares quantization in PCM", IEEE transactions on information theory 28.2, pp. 129-137, Mar. 1982.
Lowe, "Object recognition from local scale-invariant features", Proceedings of the seventh IEEE international conference on computer vision. vol. 2, Sep. 1999.
Lu, et al., "On model-based clustering of video scenes using scenelets," Proceedings IEEE International Conferenceon Multimedia and Expo. vol. 1. IEEE, 2002, pp. 301-304.
Lu, et al., "Unsupervised clustering of dominant scenes in sports video," Pattern Recognition Letters 24.15, Apr. 10, 2003, pp. 2651-2662.
Lu, et al., "Learning to track and identify players from broadcast sports videos", IEEE transactions on pattern analysis and machine intelligence 35.7, May 16, 2013, pp. 1-14.
Martinel, et al., "Re-identify people in wide area camera network", IEEE computer society conference on computer vision and pattern recognition workshops, 2012.
Morariu, et al., "Multi-agent event recognition in structured scenarios," CVPR 2011. IEEE, 2011, pp. 3289-3296.
Oh, et al., "Informative frame classification for endoscopy video", Medical Image Analysis 11.2, 2007, pp. 110-127.
Pallavi, V., et al., "Graph-based multiplayer detection and tracking in broadcast soccer videos," IEEE Transactions on Multimedia 10.5 (2008): 794-805.
Pearson, "On Lines and planes of closet fit to systems of points in space", The London, Edinburgh, and Dublin Philosophical Magazine and Journal of Science, 2, pp. 559-572, 1901.
Perronnin, et al., "Improving the fisher kernel for large-scale image classification", European conference on computer vision, Springer, Berlin, Heidelberg, 2010.
Ran, et al.. "A robust multi-athlete tracking algorithm by exploiting discriminant features and long-term dependencies." International Conference on Multimedia Modeling. Springer, Cham, 2019, pp. 411-423.
Ren, et al., "Faster R-CNN: Towards real-time object detection with region proposal networks", Advances in neural information processing systems, 2015.
Satta, et al., "A multiple component matching framework for person re-identification", International Conference on Image Analysis and Processing, Springer, Berlin, Heidelberg, pp. 140-149, 2011.
Simonyan, et al., "Very deep convolutional networks for large-scale image recognition", arXiv preprint arXiv:1409.1556, ICLR conference, Apr. 10, 2015.
Tran, et al., "Learning spatiotemporal features with 3d convolutional networks", Proceedings of the IEEE international conference on computer vision, pp. 4489-4497, 2015.
Varol, et al., "Long-term temporal convolutions for action recognition", IEEE transactions on pattern analysis and machine intelligence 40.6, Jun. 2017.
Wang, et al., "Action recognition by dense trajectories", IEEE Conference on Computer Vision and Pattern Recognition (CVPR), pp. 3169-3176, Jun. 2011.
Wen, et al., "Court reconstruction for camera calibration in broadcast basketball videos", IEEE transactions on visualization and computer graphics 22.5, 2015.
Wu, et al., "An enhanced deep feature representation for person re-identification", IEEE winter conference on applications of computer vision (WACV), IEEE, Apr. 28, 2016.
Xiao, et al., "Learning deep feature representations with domain guided dropout for person re-identification", Proceedings of the IEEE conference on computer vision and pattern recognition, pp. 1249-1258, 2016.
Yao, et al., "Fast camera self-calibration for synthesizing free viewpoint soccer video," 2017 IEEE International Conference on Acoustics, Speech and Signal Processing (ICASSP), 2017, pp. 1612-1616.
Yao, et al., "Robust moving camera calibration for synthesizing free viewpoint soccer video," 2016 IEEE International Conference on Image Processing (ICIP), 2016, pp. 1185-1189.
Ye, et al., "Jersey No. detection in sports video for athlete identification," Visual Communications and ImageProcessing, vol. 5960, SPIE, 2005, pp. 1599-1606.
Yi, Dong, et al., "Deep metric learning for person re-identification", 22nd International Conference on Pattern Recognition. IEEE, Dec. 4, 2012.
Zhao, et al., "Learning mid-level filters for person re-identification" Proceedings of the IEEE conference on computer vision and pattern recognition, 2014.
Zheng, et al., "Associating Groups of People", BMVC. vol. 2. No. 6, 2009.
Zheng, et al., "Person re-identification by probabilistic relative distance comparison", CVPR 2011, IEEE, pp. 649-656, 2011.
Ran et al. "A Robust Multi-Athlete Tracking Algorithm by Exploiting Discriminant Features and Long-Term Dependencies", Advances in Databases and Informationsystems [Lecture Notes in Computer Science], pp. 411-423, 2018.
Babaee, M. et al., "Occlusion Handling in Tracking Multiple People Using RNN", 2018 25th IEEE International Conference on Image Processing (ICIP), IEEE, Oct. 7, 2018, pp. 2715-2719, XP033454714, DOI: 10.1109/ICIP.2018.8451140.
Janz, Thorben et al., "Post-Processing of Multi-Target Trajectories for Traffic Safety Analysis", 2018 21st International Conference on Information Fusion (Fusion), ISIF, Jul. 10, 2018, pp. 2354-2361, XP033397801, DOI: 10.23919/ICIF2018.8455280.

(56) References Cited

OTHER PUBLICATIONS

Arastey, G.M., "Automated Tracking of Body Positioning Using Match Footage", Sport Performance Analysis, Nov. 15, 2019, 12 pages.
Chan, A., "Identifying Sports Players in Broadcast Videos using Recurrent and Convolutional Neural Networks", Master Thesis, McGill University, Montreal, Quebec, Aug. 2018, total 101 pages.
Gade, R. et al., "Constrained multi-target tracking for team sports activities", PSJ Transactions on Computer Vision and Applications, vol. 10, No. 2, 2018, 11 pages, DOI 10.1186/s41074-017-0038-z.
Gupta, A., et al., "Social GAN: Socially Acceptable Trajectories with Generative Adversarial Networks", 2018 IEEE/CVF Conference on Computer Vision and Pattern Recognition, 2018, pp. 2255-2264.
Japanese Patent Application No. 2018-097086 filed May 21, 2018 (Priority Application of US 11521388 B2), total 32 pages, with Machine Translation.
Kim, K. et al., "Motion fields to predict play evolution in dynamic sport scenes", 2010 IEEE Computer Society Conference on Computer Vision and Pattern Recognition, 2010, total 8 pages.
Liu, W. et al., "Multi-camera Multi-Object Tracking", ArXiv abs/1709.07065, Sep. 20, 2017, total 7 pages.
Lu, W. L., "Learning to Track and Identify Players from Broadcast Sports Videos", Doctor of Philosophy Thesis, The Faculty of Graduate Studies (Computer Science), University of British Columbia, Vancouver, 2011, total 113 pages.
McLaughlin, N. et al., "Recurrent Convolutional Network for Video-Based Person Re-identification", 2016 IEEE Conference on Computer Vision and Pattern Recognition (CVPR), 2016, pp. 1325-1334.
Ristani, E. et al., "Features for Multi-target Multi-camera Tracking and Re-identification", 2018 IEEE/CVF Conference on Computer Vision and Pattern Recognition, 2018, pp. 6036-6046.
Wang, T. et al., "Person Re-identification by Video Ranking", European Conference on Computer Vision, Zurich, Switzerland, Sep. 2014, total 16 pages.
Xing, J. et al., "Multi-object tracking through occlusions by local tracklets filtering and global tracklets association with detection responses", 2009 IEEE Conference on Computer Vision and Pattern Recognition, 2009, pp. 1200-1207.
Yamamoto, T. et al. "Multiple players tracking and identification using group detection and player No. recognition in sports video", IECON 2013—39th Annual Conference of the IEEE Industrial Electronics Society, 2013, pp. 2442-2446.
Zheng, L. et al., "Person Re-identification: Past, Present and Future", Journal of Latex Class Files, vol. 14, No. 8, Aug. 2015, total 20 pages.

* cited by examiner

SYSTEM, METHOD AND NON-TRANSITORY COMPUTER-READABLE MEDIUM FOR GENERATING TRACKABLE VIDEO FRAMES FROM BROADCAST VIDEO

CROSS-REFERENCE TO RELATED APPLICATIONS

This application is a continuation of, and claims the benefit of priority to, U.S. patent application Ser. No. 17/810,457, filed on Jul. 1, 2022, which is a continuation of and claims the benefit of priority to U.S. patent application Ser. No. 16/805,116, filed on Feb. 28, 2020, which claims the benefit of priority to U.S. Provisional Application No. 62/811,889, filed Feb. 28, 2019, which are incorporated by reference in their entireties.

This application is also related to U.S. patent application Ser. No. 16/805,009, filed Feb. 28, 2020, U.S. patent application Ser. No. 16/805,086, filed Feb. 28, 2020, and U.S. patent application Ser. No. 16/805,157, filed Feb. 28, 2020, which are incorporated by reference in their entireties.

FIELD OF THE DISCLOSURE

The present disclosure generally relates to system and method for generating trackable video frames from broadcast video.

BACKGROUND

Player tracking data has been implemented for a number of years in a number of sports for both team and player analysis. Conventional player tracking systems, however, require sports analytics companies to install fixed cameras in each venue in which a team plays. This constraint has limited the scalability of player tracking systems, as well as limited data collection to currently played matches. Further, such constraint provides a significant cost to sports analytics companies due to the costs associated with installing hardware in the requisite arenas, as well as maintaining such hardware.

SUMMARY

In some embodiments, a method of generating trackable frames from a broadcast video feed is disclosed herein. A computing system retrieves a broadcast video feed for a sporting event. The broadcast video feed includes a plurality of video frames. The computing system generates a set of frames for classification using a principal component analysis model. The set of frames are a subset of the plurality of video frames. The computing system partitions each frame of the set of frames into a plurality of clusters. The computing system classifies each frame of the plurality of frames as trackable or untrackable. Trackable frames capture a unified view of the sporting event. The computing system compares each cluster to a predetermined threshold to determine whether each cluster comprises at least a threshold number of trackable frames. The computing system classifies each cluster that includes at least the threshold number of trackable frames as trackable.

In some embodiments, a system for generating trackable frames from a broadcast video feed is disclosed herein. The system includes a processor and a memory. The memory has programming instructions store thereon, which, when executed by the processor, performs one or more operations. The one or more operations include retrieving a broadcast video feed for a sporting event. The broadcast video feed includes a plurality of video frames. The one or more operations further include generating a set of frames for classification using a principal component analysis model. The set of frames are a subset of the plurality of video frames. The one or more operations further include partitioning each frame of the set of frames into a plurality of clusters. The one or more operations further include classifying each frame of the plurality of frames as trackable or untrackable. Trackable frames capture a unified view of the sporting event. The one or more operations further include comparing each cluster to a predetermined threshold to determine whether each cluster comprises at least a threshold number of trackable frames. The one or more operations further include classifying each cluster that includes at least the threshold number of trackable frames as trackable.

In some embodiments, a non-transitory computer readable medium is disclosed herein. The non-transitory computer readable medium includes one or more sequences of instructions that, when executed by one or more processors, perform one or more operations. The one or more operations include retrieving a broadcast video feed for a sporting event. The broadcast video feed includes a plurality of video frames. The one or more operations further include generating a set of frames for classification using a principal component analysis model. The set of frames are a subset of the plurality of video frames. The one or more operations further include partitioning each frame of the set of frames into a plurality of clusters. The one or more operations further include classifying each frame of the plurality of frames as trackable or untrackable. Trackable frames capture a unified view of the sporting event. The one or more operations further include comparing each cluster to a predetermined threshold to determine whether each cluster comprises at least a threshold number of trackable frames. The one or more operations further include classifying each cluster that includes at least the threshold number of trackable frames as trackable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Player tracking data has been an invaluable resource for leagues and teams to evaluate not only the team itself, but the players on the team. Conventional approaches to harvesting or generating player tracking data are limited, however, relied on installing fixed cameras in a venue in which a sporting event would take place. In other words, conventional approaches for a team to harvest or generate player tracking data required that team to equip each venue with a fixed camera system. As those skilled in the art recognize, this constraint has severely limited the scalability of player tracking systems. Further, this constraint also limits player tracking data to matches played after installation of the fixed camera system, as historical player tracking data would simply be unavailable.

The one or more techniques describe herein provide a significant improvement over conventional systems by eliminating the need for a fixed camera system. Instead, the one or more techniques described herein are directed to leveraging the broadcast video feed of a sporting event to generate player tracking data. By utilizing the broadcast video feed of the sporting event, not only is the need for a dedicated fixed camera system in each arena eliminated, but generating historical player tracking data from historical sporting events would now be possible.

Leveraging the broadcast video feed of the sporting event is not, however, a trivial task. For example, included in a broadcast video feed may a variety of different camera angles, close-ups of players, close-ups of the crowd, close-ups of the coach, video of the commentators, commercials, halftime shows, and the like. Accordingly, to address these issues, one or more techniques described herein are directed to clipping or partitioning a broadcast video feed into its constituent parts, e.g., different scenes in a movie or commercials from a basketball game. By clipping or partitioning the broadcast video feed into its constituent parts, the overall system may better understand the information presented to it so that the system can more effectively extract data from the underlying broadcast video feed.

Figure 1:
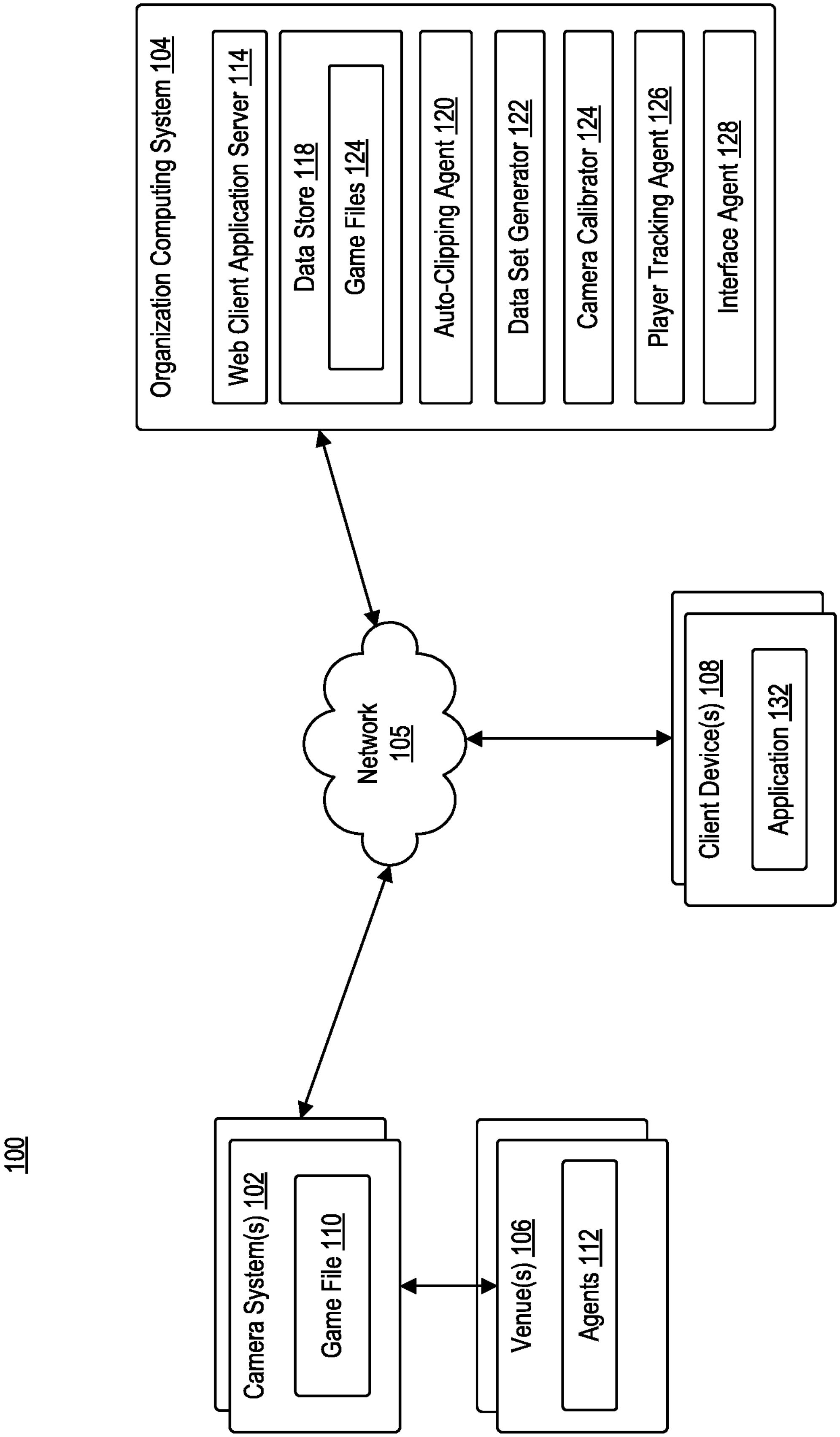
FIG. 1 is a block diagram illustrating a computing environment, according to example embodiments.

FIG. 1 is a block diagram illustrating a computing environment 100, according to example embodiments. Computing environment 100 may include camera system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Camera system 102 may be positioned in a venue 106. For example, venue 106 may be configured to host a sporting event that includes one or more agents 112. Camera system 102 may be configured to capture the motions of all agents (i.e., players) on the playing surface, as well as one or more other objects of relevance (e.g., ball, referees, etc.). In some embodiments, camera system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects of relevance. As those skilled in the art recognize, utilization of such camera system (e.g., camera system 102) may result in many different camera views of the court (e.g., high sideline view, free-throw line view, huddle view, face-off view, end zone view, etc.). Generally, camera system 102 may be utilized for the broadcast feed of a given match. Each frame of the broadcast feed may be stored in a game file 110.

Camera system 102 may be configured to communicate with organization computing system 104 via network 105. Organization computing system 104 may be configured to manage and analyze the broadcast feed captured by camera system 102. Organization computing system 104 may include at least a web client application server 114, a data store 118, an auto-clipping agent 120, a data set generator 122, a camera calibrator 124, a player tracking agent 126, and an interface agent 128. Each of auto-clipping agent 120, data set generator 122, camera calibrator 124, player tracking agent 126, and interface agent 128 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include the broadcast data of a given match. For example, the broadcast data may a plurality of video frames captured by camera system 102.

Auto-clipping agent 120 may be configured parse the broadcast feed of a given match to identify a unified view of the match. In other words, auto-clipping agent 120 may be configured to parse the broadcast feed to identify all frames of information that are captured from the same view. In one example, such as in the sport of basketball, the unified view may be a high sideline view. Auto-clipping agent 120 may clip or segment the broadcast feed (e.g., video) into its constituent parts (e.g., difference scenes in a movie, commercials from a match, etc.). To generate a unified view, auto-clipping agent 120 may identify those parts that capture the same view (e.g., high sideline view). Accordingly, auto-clipping agent 120 may remove all (or a portion) of untrackable parts of the broadcast feed (e.g., player close-ups, commercials, half-time shows, etc.). The unified view may be stored as a set of trackable frames in a database.

Data set generator 122 may be configured to generate a plurality of data sets from the trackable frames. In some embodiments, data set generator 122 may be configured to identify body pose information. For example, data set generator 122 may utilize body pose information to detect players in the trackable frames. In some embodiments, data set generator 122 may be configured to further track the movement of a ball or puck in the trackable frames. In some embodiments, data set generator 122 may be configured to segment the playing surface in which the event is taking place to identify one or more markings of the playing surface. For example, data set generator 122 may be configured to identify court (e.g., basketball, tennis, etc.) markings, field (e.g., baseball, football, soccer, rugby, etc.) markings, ice (e.g., hockey) markings, and the like. The plurality of data sets generated by data set generator 122 may be subsequently used by camera calibrator 124 for calibrating the cameras of each camera system 102.

Camera calibrator 124 may be configured to calibrate the cameras of camera system 102. For example, camera calibrator 124 may be configured to project players detected in the trackable frames to real world coordinates for further analysis. Because cameras in camera systems 102 are constantly moving in order to focus on the ball or key plays, such cameras are unable to be pre-calibrated. Camera calibrator 124 may be configured to improve or optimize player projection parameters using a homography matrix.

Player tracking agent 126 may be configured to generate tracks for each player on the playing surface. For example, player tracking agent 126 may leverage player pose detections, camera calibration, and broadcast frames to generate such tracks. In some embodiments, player tracking agent 126 may further be configured to generate tracks for each player, even if, for example, the player is currently out of a trackable frame. For example, player tracking agent 126 may utilize body pose information to link players that have left the frame of view.

Interface agent 128 may be configured to generate one or more graphical representations corresponding to the tracks for each player generated by player tracking agent 126. For example, interface agent 128 may be configured to generate one or more graphical user interfaces (GUIs) that include graphical representations of player tracking each prediction generated by player tracking agent 126.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
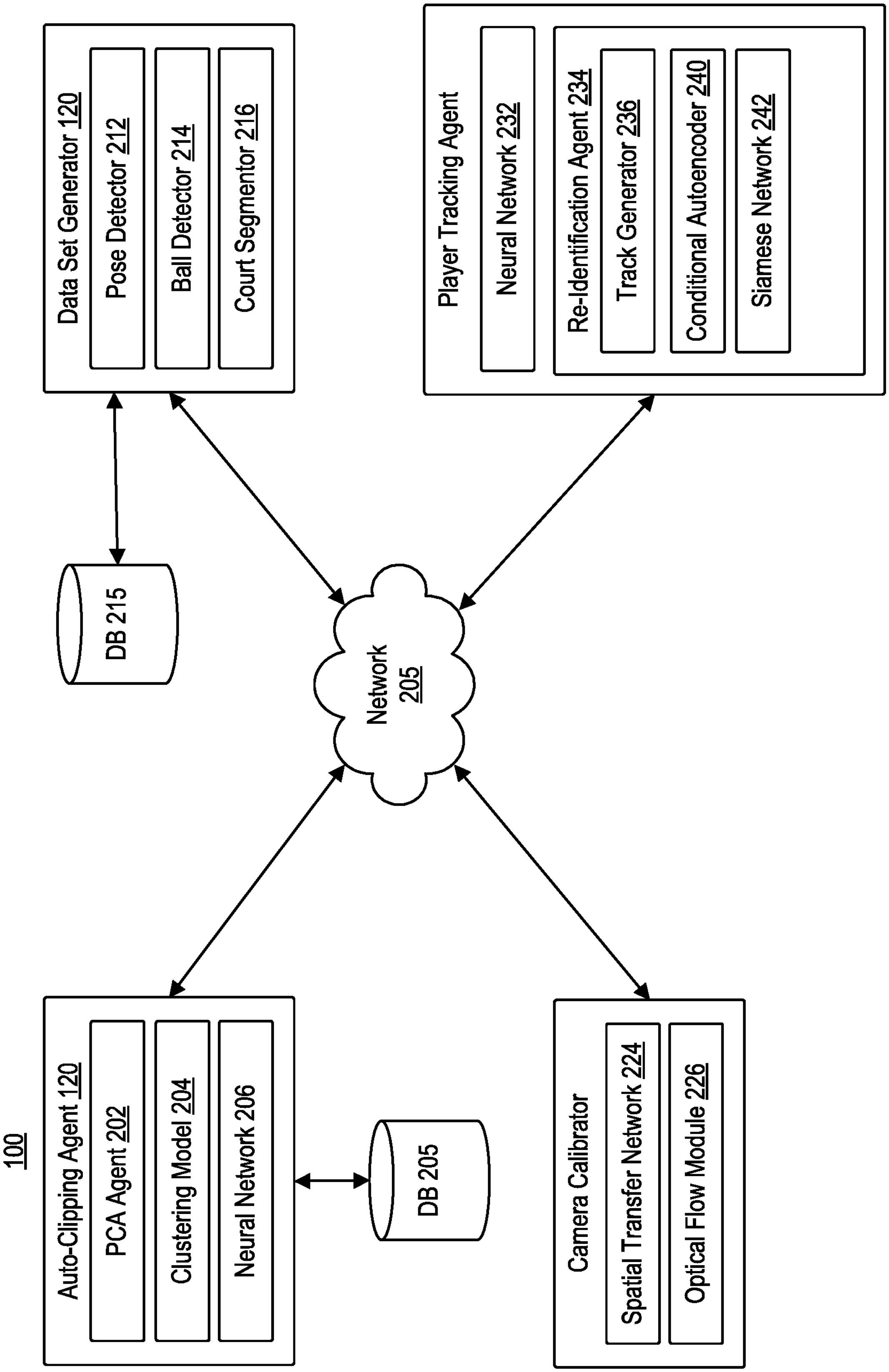
FIG. 2 is a block diagram illustrating a computing environment, according to example embodiments.

FIG. 2 is a block diagram illustrating a computing environment 200, according to example embodiments. As illustrated, computing environment 200 includes auto-clipping agent 120, data set generator 122, camera calibrator 124, and player tracking agent 126 communicating via network 205.

Network 205 may be of any suitable type, including individual connections via the Internet, such as cellular or Wi-Fi networks. In some embodiments, network 205 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 205 may include any type of computer networking arrangement used to exchange data or information. For example, network 205 may be the Internet, a private data network, virtual private network using a public network and/or other suitable connection(s) that enables components in computing environment 200 to send and receive information between the components of environment 200.

Auto-clipping agent 120 may include principal component analysis (PCA) agent 202, clustering model 204, and neural network 206. As recited above, when trying to understand and extract data from a broadcast feed, auto-clipping agent 120 may be used to clip or segment the video into its constituent parts. In some embodiments, auto-clipping agent 120 may focus on separating a predefined, unified view (e.g., a high sideline view) from all other parts of the broadcast stream.

PCA agent 202 may be configured to utilize a PCA analysis to perform per frame feature extraction from the broadcast feed. For example, given a pre-recorded video, PCA agent 202 may extract a frame every X-seconds (e.g., 10 seconds) to build a PCA model of the video. In some embodiments, PCA agent 202 may generate the PCA model using incremental PCA, through which PCA agent 202 may select a top subset of components (e.g., top 120 components) to generate the PCA model. PCA agent 202 may be further configured to extract one frame every X seconds (e.g., one second) from the broadcast stream and compress the frames using PCA model. In some embodiments, PCA agent 202 may utilize PCA model to compress the frames into 120-dimensional form. For example, PCA agent 202 may solve for the principal components in a per video manner and keep the top 100 components per frame to ensure accurate clipping.

Clustering model 204 may be configured to the cluster the top subset of components into clusters. For example, clustering model 204 may be configured to center, normalize, and cluster the top 120 components into a plurality of clusters. In some embodiments, for clustering of compressed frames, clustering model 204 may implement k-means clustering. In some embodiments, clustering model 204 may set k=9 clusters. K-means clustering attempts to take some data $x=\{x_1, x_2, \ldots, x_n\}$ and divide it into k subsets, $S=\{S_1, S_2, \ldots S_k\}$ by optimizing:

$$\underset{S}{\arg\min} \sum_{j}^{k} \sum_{x \in S_j} \|x - \mu_j\|^2$$

where $\mu_j$ is the mean of the data in the set $S_j$. In other words, clustering model 204 attempts to find clusters with the smallest inter-cluster variance using k-means clustering techniques. Clustering model 204 may label each frame with its respective cluster number (e.g., cluster 1, cluster 2, . . . , cluster k).

Neural network 206 may be configured to classify each frame as trackable or untrackable. A trackable frame may be representative of a frame that includes captures the unified view (e.g., high sideline view). An untrackable frame may be representative of a frame that does not capture the unified view. To train neural network 206, an input data set that includes thousands of frames pre-labeled as trackable or untrackable that are run through the PCA model may be used. Each compressed frame and label pair (i.e., cluster number and trackable/untrackable) may be provided to neural network 206 for training.

In some embodiments, neural network 206 may include four layers. The four layers may include an input layer, two hidden layers, and an output layer. In some embodiments, input layer may include 120 units. In some embodiments, each hidden layer may include 240 units. In some embodiments, output layer may include two units. The input layer and each hidden layer may use sigmoid activation functions. The output layer may use a SoftMax activation function. To train neural network 206, auto-clipping agent 120 may reduce (e.g., minimize) the binary cross-entropy loss between the predicted label for sample $\hat{y}_j$ and the true label $y_j$ by:

$$H = -\frac{1}{N} \sum_{j}^{N} y_j \log y + (1 - y_j) \log(1 - \hat{y}_j)$$

Accordingly, once trained, neural network 206 may be configured to classify each frame as untrackable or trackable. As such, each frame may have two labels: a cluster number and trackable/untrackable classification. Auto-clipping agent 120 may utilize the two labels to determine if a given cluster is deemed trackable or untrackable. For example, if auto-clipping agent 120 determines that a threshold number of frames in a cluster are considered trackable (e.g., 80%), auto-clipping agent 120 may conclude that all frames in the cluster are trackable. Further, if auto-clipping agent 120 determines that less than a threshold number of frames in a cluster are considered untrackable (e.g., 30% and below), auto-clipping agent 120 may conclude that all frames in the cluster are untrackable. Still further, if auto-clipping agent 120 determines that a certain number of frames in a cluster are considered trackable (e.g., between 30% and 80%), auto-clipping agent 120 may request that an administrator further analyze the cluster. Once each frame is classified, auto-clipping agent 120 may clip or segment the trackable frames. Auto-clipping agent 120 may store the segments of trackable frames in database 205 associated therewith.

Data set generator 122 may be configured to generate a plurality of data sets from auto-clipping agent 120. As illustrated, data set generator 122 may include pose detector 212, ball detector 214, and playing surface segmenter 216. Pose detector 212 may be configured to detect players within the broadcast feed. Data set generator 122 may provide, as input, to pose detector 212 both the trackable frames stored in database 205 as well as the broadcast video feed. In some embodiments, pose detector 212 may implement Open Pose to generate body pose data to detect players in the broadcast feed and the trackable frames. In some embodiments, pose detector 212 may implement sensors positioned on players to capture body pose information. Generally, pose detector 212 may use any means to obtain body pose information from the broadcast video feed and the trackable frame. The output from pose detector 212 may be pose data stored in database 215 associated with data set generator 122.

Ball detector 214 may be configured to detect and track the ball (or puck) within the broadcast feed. Data set generator 122 may provide, as input, to ball detector 214 both the trackable frames stored in database 205 and the broadcast video feed. In some embodiments, ball detector 214 may utilize a faster region-convolutional neural network (R-CNN) to detect and track the ball in the trackable frames and broadcast video feed. Faster R-CNN is a regional proposal based network. Faster R-CNN uses a convolutional neural network to propose a region of interest, and then classifies the object in each region of interest. Because it is a single unified network, the regions of interest and the classification steps may improve each other, thus allowing the classification to handle objects of various sizes. The output from ball detector 214 may be ball detection data stored in database 215 associated with data set generator 122.

Playing surface segmenter 216 may be configured to identify playing surface markings in the broadcast feed. Data set generator 122 may provide, as input, to playing surface segmenter 216 both trackable frames stored in database 205 and the broadcast video feed. In some embodiments, playing surface segmenter 216 may be configured to utilize a neural network to identify playing surface markings. The output from playing surface segmenter 216 may be playing surface markings stored in database 215 associated with data set generator 122.

Camera calibrator 124 may be configured to address the issue of moving camera calibration in sports. Camera calibrator 124 may include spatial transfer network 224 and optical flow module 226. Camera calibrator 124 may receive, as input, segmented playing surface information generated by playing surface segmenter 216, the trackable clip information, and posed information. Given such inputs, camera calibrator 124 may be configured to project coordinates in the image frame to real-world coordinates for tracking analysis.

Keyframe matching module 224 may receive, as input, output from playing surface segmenter 216 and a set of templates. For each frame, keyframe matching module 224 may match the output from playing surface segmenter 216 to a template. Those frames that are able to match to a given template are considered keyframes. In some embodiments, keyframe matching module 224 may implement a neural network to match the one or more frames. In some embodiments, keyframe matching module 224 may implement cross-correlation to match the one or more frames.

Spatial transformer network (STN) 224 may be configured to receive, as input, the identified keyframes from keyframe matching module 224. STN 224 may implement a neural network to fit a playing surface model to segmentation information of the playing surface. By fitting the playing surface model to such output, STN 224 may generate homography matrices for each keyframe.

Optical flow module 226 may be configured to identify the pattern of motion of objects from one trackable frame to another. In some embodiments, optical flow module 226 may receive, as input, trackable frame information and body pose information for players in each trackable frame. Optical flow module 226 may use body pose information to remove players from the trackable frame information. Once removed, optical flow module 226 may determine the motion between frames to identify the motion of a camera between successive frames. In other words, optical flow module 226 may identify the flow field from one frame to the next.

Optical flow module 226 and STN 224 may work in conjunction to generate a homography matrix. For example, optical flow module 226 and STN 224 may generate a homography matrix for each trackable frame, such that a camera may be calibrated for each frame. The homography matrix may be used to project the track or position of players into real-world coordinates. For example, the homography matrix may indicate a 2-dimensional to 2-dimensional transform, which may be used to project the players' locations from image coordinates to the real world coordinates on the playing surface.

Player tracking agent 126 may be configured to generate a track for each player in a match. Player tracking agent 126 may include neural network 232 and re-identification agent 232. Player tracking agent 126 may receive, as input, trackable frames, pose data, calibration data, and broadcast video frames. In a first phase, player tracking agent 126 may match pairs of player patches, which may be derived from pose information, based on appearance and distance. For example, let $$H_j^i$$

be the player patch of the $j^{th}$ player at time t, and let $$I_j^t = \{x_j^t, y_j^t, w_j^t, h_j^t\}$$

be the image coordinates $$x_j^t, y_j^t,$$

the width $$w_j^t,$$

and the height $$h_j^t$$

of the $j^{th}$ player at time t. Using this, player tracking agent 126 may associate any pair of detections using the appearance cross correlation $$C_{ij}^t = H_i^t * H_i^{t+1} \text{ and } L_{ij}^t = \left\| I_i^t - I_j^{t+1} \right\|_2^2$$

by finding:

$$\arg\max_{ij}\left(C_{ij}^t + L_{ij}^t\right)$$

where l is the bounding box positions (x,y), width w, and height h; C is the cross correlation between the image patches (e.g., image cutout using a bounding box) and measures similarity between two image patches; and L is a measure of the difference (e.g., distance) between two bounding boxes l.

Performing this for every pair may generate a large set of short tracklets. The end points of these tracklets may then be associated with each other based on motion consistency and color histogram similarity.

For example, let $v_i$ be the extrapolated velocity from the end of the $i^{th}$ tracklet and $v_j$ be the velocity extrapolated from the beginning of the $j^{th}$ tracklet. Then $c_{ij}=v_i \cdot v_j$ may represent the motion consistency score. Furthermore, let $p(h)_i$ represent the likelihood of a color h being present in an image patch i. Player tracking agent 126 may measure the color histogram similarity using Bhattacharyya distance:

$$D_B(p_i,p_j)=-\ln(BC(p_i,p_j)) \text{ with } BC(p_i,p_j)=\Sigma_h\sqrt{p_i(h)p_j(h)}$$

Recall, tracking agent 120 finds the matching pair of tracklets by finding:

$$\arg\max_{ij}(c_{ij} + D_B(p_i, p_j)).$$

Solving for every pair of broken tracklets may result in a set of clean tracklets, while leaving some tracklets with large, i.e., many frames, gaps. To connect the large gaps, player tracking agent may augment affinity measures to include a motion field estimation, which may account for the change of player direction that occurs over many frames.

The motion field may be a vector field that represents the velocity magnitude and direction as a vector on each location on the playing surface. Given the known velocity of a number of players on the playing surface, the full motion field may be generated using cubic spline interpolation. For example, let $$X_i = \{x_i^t\}_{t\in(0,T)}$$

to be the court position of a player i at every time t. Then, there may exist a pair of points that have a displacement $$d_i^\lambda(x_i^t) = x_i^t - x_i^{t+1} \text{ if } \lambda < T.$$

Accordingly, the motion field may then be:

$$V(x, \lambda) = G(x, 5) * \sum_i d_i^\lambda(d_i^t),$$

where G(x, 5) may be a Gaussian kernel with standard deviation equal to about five feet. In other words, motion field may be a Gaussian blur of all displacements.

Neural network 232 may be used to predict player trajectories given ground truth player trajectories. Given a set of ground truth player trajectories, $X_i$, the velocity of each player at each frame may be calculated, which may provide the ground truth motion field for neural network 232 to learn. For example, given a set of ground truth player trajectories $X_i$, player tracking agent 126 may be configured to generate the set $\hat{V}(x, \lambda)$, where $\hat{V}(x, \lambda)$ may be the predicted motion field. Neural network 232 may be trained, for example, to minimize $$\|V(x, \lambda) - \hat{V}(x, \lambda)\|_2^2.$$

Player trajectory agent may then generate the affinity score for any tracking gap of size λ by:

$$K_{ij} = V(x,\lambda) \cdot d_{ij}$$

where $$d_{ij} = x_i^t - x_j^{t+\lambda}$$

is the displacement vector between all broken tracks with a gap size of A.

Re-identification agent 234 may be configured to link players that have left the frame of view. Re-identification agent 234 may include track generator 236, conditional autoencoder 240, and Siamese network 242.

Track generator 236 may be configured to generate a gallery of tracks. Track generator 236 may receive a plurality of tracks from database 205. For each track X, there may include a player identity label y, and for each player patch l, pose information p may be provided by the pose detection stage. Given a set of player tracks, track generator 236 may build a gallery for each track where the jersey number of a player (or some other static feature) is always visible. The body pose information generated by data set generator 122 allows track generator 236 to determine a player's orientation. For example, track generator 236 may utilize a heuristic method, which may use the normalized shoulder width to determine the orientation:

$$S_{orient} = \frac{\|l_{Lshoulder} - l_{Rshoulder}\|_2}{\|l_{Neck} - l_{Hip}\|_2}$$

where l may represent the location of one body part. The width of shoulder may be normalized by the length of the torso so that the effect of scale may be eliminated. As two shoulders should be apart when a player faces towards or backwards from the camera, track generator 236 may use those patches whose $S_{orient}$ is larger than a threshold to build the gallery. After this stage, each track $X_n$, may include a gallery:

$$G_n = \{l_i | S_{orient,i} > \text{thresh}\} \forall l_i \in X_n$$

Conditional autoencoder 240 may be configured to identify one or more features in each track. For example, unlike conventional approaches to re-identification issues, players in team sports may have very similar appearance features, such as clothing style, clothing color, and skin color. One of the more intuitive differences may be the jersey number that may be shown at the front and/or back side of each jersey. In order to capture those specific features, conditional autoencoder 240 may be trained to identify such features.

In some embodiments, conditional autoencoder 240 may be a three-layer convolutional autoencoder, where the kernel sizes may be 3×3 for all three layers, in which there are 64, 128, 128 channels respectively. Those hyper-parameters may be tuned to ensure that jersey number may be recognized from the reconstructed images so that the desired features may be learned in the autoencoder. In some embodiments, $f(l_i)$ may be used to denote the features that are learned from image i.

Use of conditional autoencoder 240 improves upon conventional processes for a variety of reasons. First, there is typically not enough training data for every player because some players only play a very short time in each game. Second, different teams can have the same jersey colors and jersey numbers, so classifying those players may be difficult.

Siamese network 242 may be used to measure the similarity between two image patches. For example, Siamese network 242 may be trained to measure the similarity between two image patches based on their feature representations f(I). Given two image patches, their feature representations $f(l_i)$ and $f(l_j)$ may be flattened, connected, and input into a perception network. In some embodiments, $L_2$ norm may be used to connect the two sub-networks of $f(l_i)$ and $f(l_j)$. In some embodiments, perception network may include three layers, which include may 1024, 512, and 216 hidden units, respectively. Such network may be used to measure the similarity $s(l_i, l_j)$ between every pair of image patches of the two tracks that have no time overlapping. In order to increase the robustness of the prediction, the final similarity score of the two tracks may be the average of all pairwise scores in their respective galleries:

$$S(x_n, x_m) = \frac{1}{|G_n||G_m|} \sum_{i\in G_n, j\in G_m} s(I_i, I_j)$$

This similarity score may be computed for every two tracks that do not have time overlapping. If the score is higher than some threshold, those two tracks may be associated.

Figure 3:
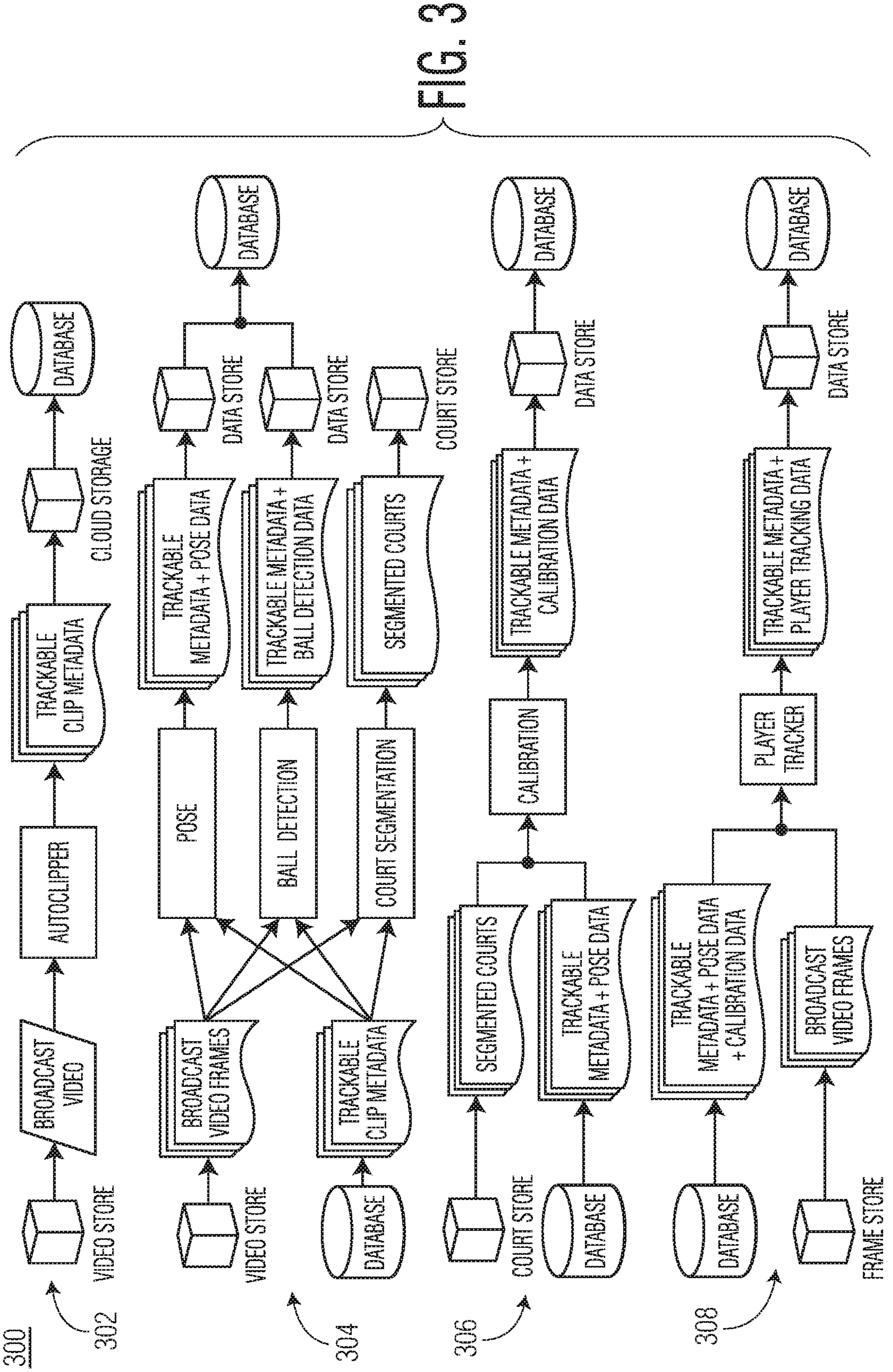
FIG. 3 is a block diagram illustrating aspects of operations discussed above and below in conjunction with FIG. 2 and FIGS. 4-10, according to example embodiments.

FIG. 3 is a block diagram 300 illustrating aspects of operations discussed above and below in conjunction with FIG. 2 and FIGS. 4-10, according to example embodiments.

Block diagram 300 may illustrate the overall workflow of organization computing system 104 in generating player tracking information. Block diagram 300 may include set of operations 302-308. Set of operations 302 may be directed to generating trackable frames (e.g., Method 500 in FIG. 5). Set of operations 304 may be directed to generating one or more data sets from trackable frames (e.g., operations performed by data set generator 122). Set of operations 306 may be directed to camera calibration operations (e.g., Method 700 in FIG. 7). Set of operations 308 may be directed to generating and predicting player tracks (e.g., Method 900 if FIG. 9 and Method 1000 in FIG. 10).

Figure 4:
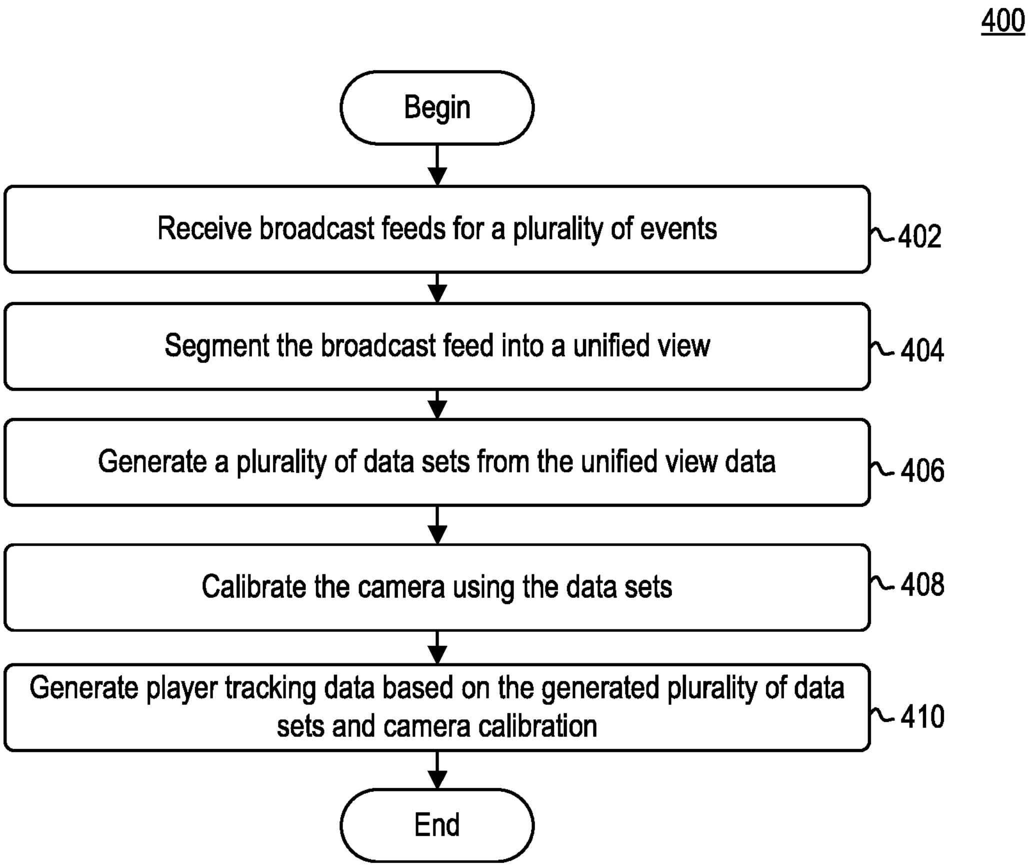
FIG. 4 is a flow diagram illustrating a method of generating player tracks, according to example embodiments.

FIG. 4 is a flow diagram illustrating a method 400 of generating player tracks, according to example embodiments. Method 400 may begin at step 402.

At step 402, organization computing system 104 may receive (or retrieve) a broadcast feed for an event. In some embodiments, the broadcast feed may be a live feed received in real-time (or near real-time) from camera system 102. In some embodiments, the broadcast feed may be a broadcast feed of a game that has concluded. Generally, the broadcast feed may include a plurality of frames of video data. Each frame may capture a different camera perspective.

At step 404, organization computing system 104 may segment the broadcast feed into a unified view. For example, auto-clipping agent 120 may be configured to parse the plurality of frames of data in the broadcast feed to segment the trackable frames from the untrackable frames. Generally, trackable frames may include those frames that are directed to a unified view. For example, the unified view may be considered a high sideline view. In other examples, the unified view may be an endzone view. In other examples, the unified view may be a top camera view.

At step 406, organization computing system 104 may generate a plurality of data sets from the trackable frames (i.e., the unified view). For example, fata set generator 122 may be configured to generate a plurality of data sets based on trackable clips received from auto-clipping agent 120. In some embodiments, pose detector 212 may be configured to detect players within the broadcast feed. Data set generator 122 may provide, as input, to pose detector 212 both the trackable frames stored in database 205 as well as the broadcast video feed. The output from pose detector 212 may be pose data stored in database 215 associated with data set generator 122.

Ball detector 214 may be configured to detect and track the ball (or puck) within the broadcast feed. Data set generator 122 may provide, as input, to ball detector 214 both the trackable frames stored in database 205 and the broadcast video feed. In some embodiments, ball detector 214 may utilize a faster R-CNN to detect and track the ball in the trackable frames and broadcast video feed. The output from ball detector 214 may be ball detection data stored in database 215 associated with data set generator 122.

Playing surface segmenter 216 may be configured to identify playing surface markings in the broadcast feed. Data set generator 122 may provide, as input, to playing surface segmenter 216 both trackable frames stored in database 205 and the broadcast video feed. In some embodiments, playing surface segmenter 216 may be configured to utilize a neural network to identify playing surface markings. The output from playing surface segmenter 216 may be playing surface markings stored in database 215 associated with data set generator 122.

Accordingly, data set generator 120 may generate information directed to player location, ball location, and portions of the court in all trackable frames for further analysis.

At step 408, organization computing system 104 may calibrate the camera in each trackable frame based on the data sets generated in step 406. For example, camera calibrator 124 may be configured to calibrate the camera in each trackable frame by generating a homography matrix, using the trackable frames and body pose information. The homography matrix allows camera calibrator 124 to take those trajectories of each player in a given frame and project those trajectories into real-world coordinates. By projection player position and trajectories into real world coordinates for each frame, camera calibrator 124 may ensure that the camera is calibrated for each frame.

At step 410, organization computing system 104 may be configured to generate or predict a track for each player. For example, player tracking agent 126 may be configured to generate or predict a track for each player in a match. Player tracking agent 126 may receive, as input, trackable frames, pose data, calibration data, and broadcast video frames. Using such inputs, player tracking agent 126 may be configured to construct player motion throughout a given match. Further, player tracking agent 126 may be configured to predict player trajectories given previous motion of each player.

Figure 5:
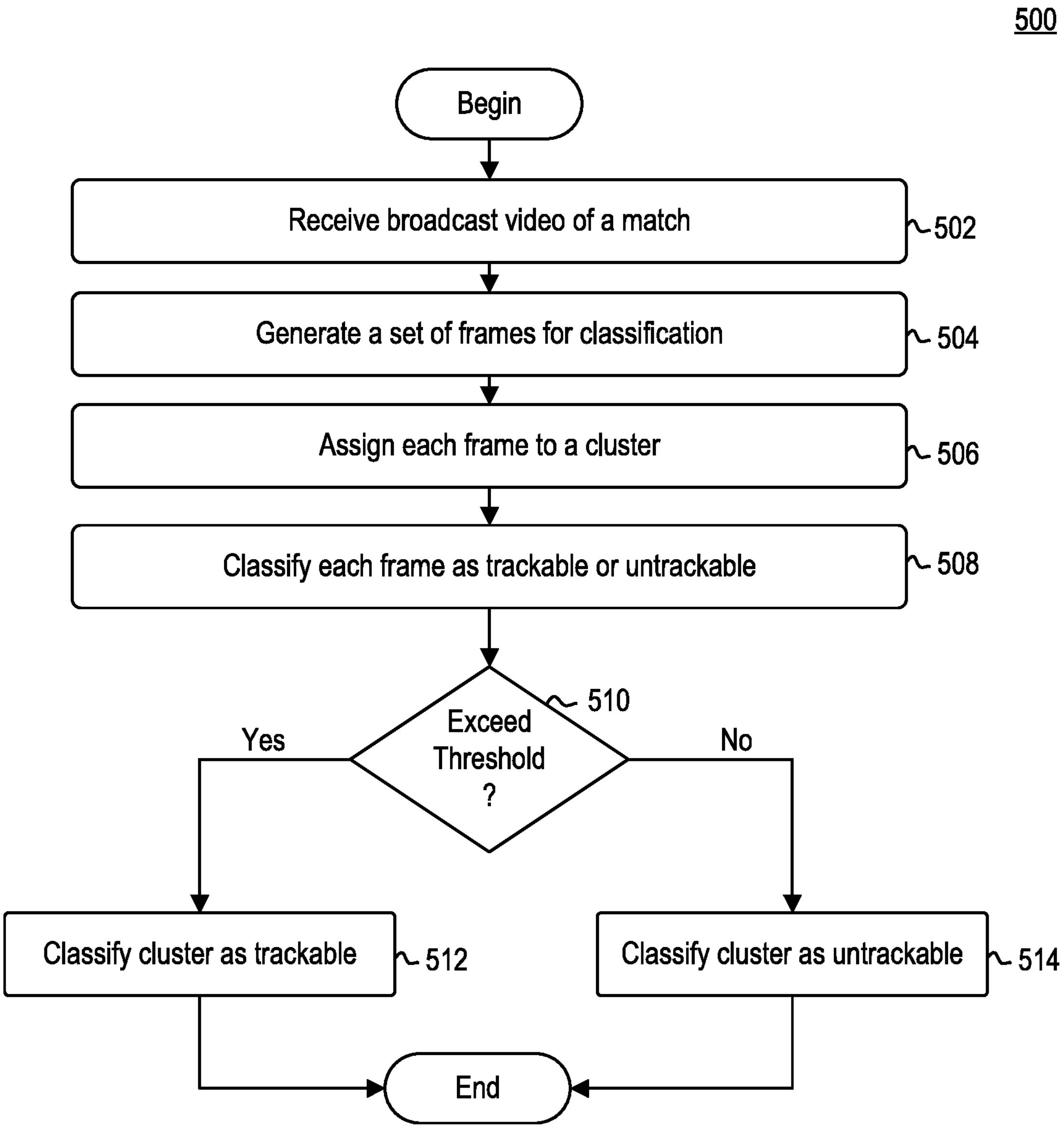
FIG. 5 is a flow diagram illustrating a method of generating trackable frames, according to example embodiments.

FIG. 5 is a flow diagram illustrating a method 500 of generating trackable frames, according to example embodiments. Method 500 may correspond to operation 404 discussed above in conjunction with FIG. 4. Method 500 may begin at step 502.

At step 502, organization computing system 104 may receive (or retrieve) a broadcast feed for an event. In some embodiments, the broadcast feed may be a live feed received in real-time (or near real-time) from camera system 102. In some embodiments, the broadcast feed may be a broadcast feed of a game that has concluded. Generally, the broadcast feed may include a plurality of frames of video data. Each frame may capture a different camera perspective.

At step 504, organization computing system 104 may generate a set of frames for image classification. For example, auto-clipping agent 120 may utilize a PCA analysis to perform per frame feature extraction from the broadcast feed. Given, for example, a pre-recorded video, auto-clipping agent 120 may extract a frame every X-seconds (e.g., 10 seconds) to build a PCA model of the video. In some embodiments, auto-clipping agent 120 may generate the PCA model using incremental PCA, through which auto-clipping agent 120 may select a top subset of components (e.g., top 120 components) to generate the PCA model. Auto-clipping agent 120 may be further configured to extract one frame every X seconds (e.g., one second) from the broadcast stream and compress the frames using PCA model. In some embodiments, auto-clipping agent 120 may utilize PCA model to compress the frames into 120-dimensional form. For example, auto-clipping agent 120 may solve for the principal components in a per video manner and keep the top 100 components per frame to ensure accurate clipping. Such subset of compressed frames may be considered the set of frames for image classification. In other words, PCA model may be used to compress each frame to a small vector, so that clustering can be conducted on the frames more efficiently. The compression may be conducted by selecting the top N components from PCA model to represent the frame. In some examples, N may be 100.

At step 506, organization computing system 104 may assign each frame in the set of frames to a given cluster. For example, auto-clipping agent 120 may be configured to center, normalize, and cluster the top 120 components into a plurality of clusters. In some embodiments, for clustering of compressed frames, auto-clipping agent 120 may implement k-means clustering. In some embodiments, auto-clipping agent 120 may set k=9 clusters. K-means clustering attempts to take some data $x=\{x_1, x_2, \ldots, x_n\}$ and divide it into k subsets, $S=\{S_1, S_2, \ldots S_k\}$ by optimizing:

$$\underset{S}{\arg\min} \sum_{j}^{k} \sum_{x \in S_j} \|x - \mu_j\|^2$$

where μj is the mean of the data in the set $S_j$. In other words, clustering model 204 attempts to find clusters with the smallest inter-cluster variance using k-means clustering techniques. Clustering model 204 may label each frame with its respective cluster number (e.g., cluster 1, cluster 2, . . . , cluster k).

At step 508, organization computing system 104 may classify each frame as trackable or untrackable. For example, auto-clipping agent 120 may utilize a neural network to classify each frame as trackable or untrackable. A trackable frame may be representative of a frame that includes captures the unified view (e.g., high sideline view). An untrackable frame may be representative of a frame that does not capture the unified view. To train the neural network (e.g., neural network 206), an input data set that includes thousands of frames pre-labeled as trackable or untrackable that are run through the PCA model may be used. Each compressed frame and label pair (i.e., cluster number and trackable/untrackable) may be provided to neural network for training. Accordingly, once trained, auto-clipping agent 120 may classify each frame as untrackable or trackable. As such, each frame may have two labels: a cluster number and trackable/untrackable classification.

At step 510, organization computing system 104 may compare each cluster to a threshold. For example, auto-clipping agent 120 may utilize the two labels to determine if a given cluster is deemed trackable or untrackable. In some embodiments, f auto-clipping agent 120 determines that a threshold number of frames in a cluster are considered trackable (e.g., 80%), auto-clipping agent 120 may conclude that all frames in the cluster are trackable. Further, if auto-clipping agent 120 determines that less than a threshold number of frames in a cluster are considered untrackable (e.g., 30% and below), auto-clipping agent 120 may conclude that all frames in the cluster are untrackable. Still further, if auto-clipping agent 120 determines that a certain number of frames in a cluster are considered trackable (e.g., between 30% and 80%), auto-clipping agent 120 may request that an administrator further analyze the cluster.

If at step 510 organization computing system 104 determines that greater than a threshold number of frames in the cluster are trackable, then at step 512 auto-clipping agent 120 may classify the cluster as trackable.

If, however, at step 510 organization computing system 104 determines that less than a threshold number of frames in the cluster are trackable, then at step 514, auto-clipping agent 120 may classify the cluster as untrackable.

Figure 6:
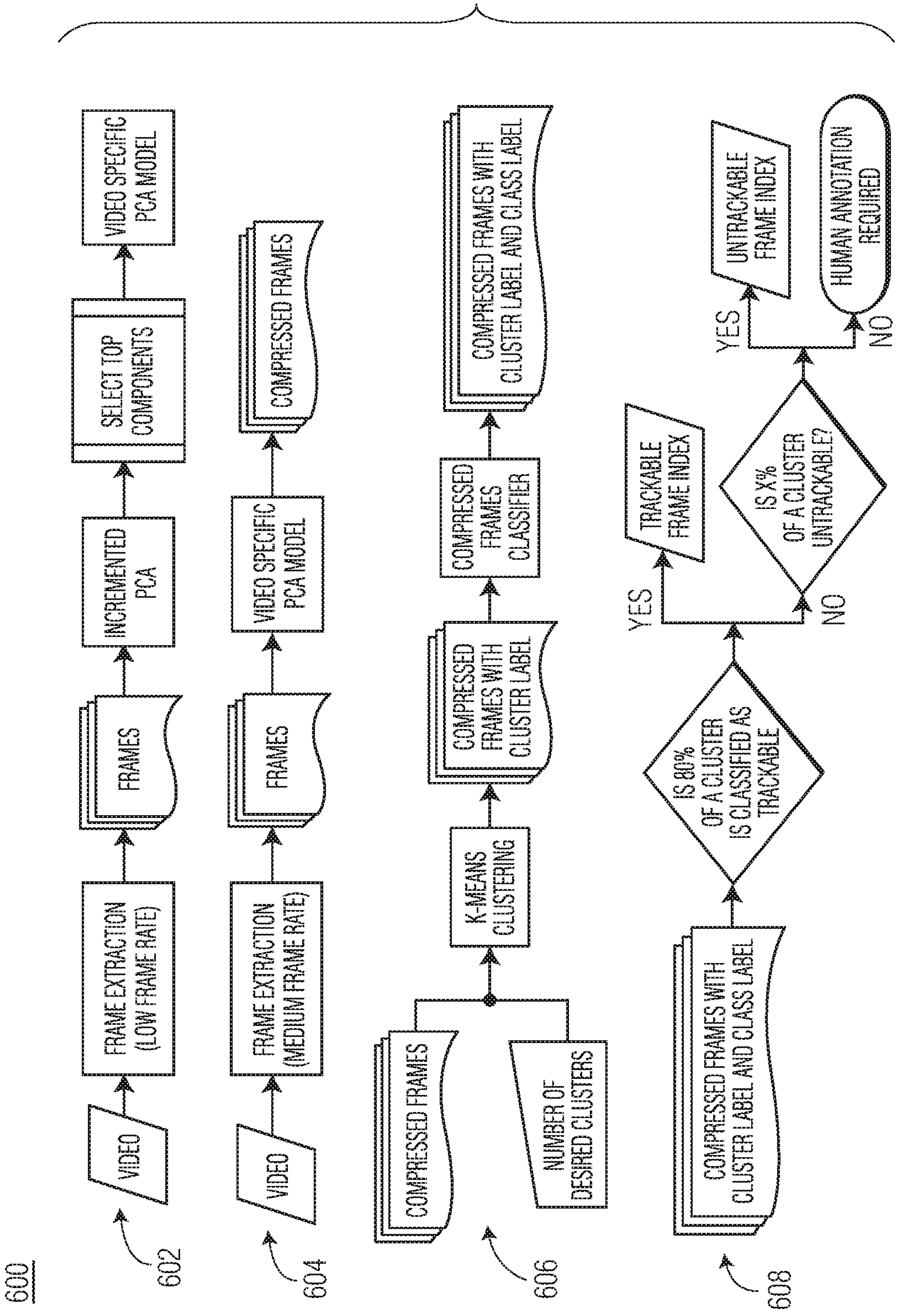
FIG. 6 is a block diagram illustrating aspects of operations discussed above in conjunction with FIG. 5, according to example embodiments.

FIG. 6 is a block diagram 600 illustrating aspects of operations discussed above in conjunction with method 500, according to example embodiments. As shown, block diagram 600 may include a plurality of sets of operations 602-608.

At set of operations 602, video data (e.g., broadcast video) may be provided to auto-clipping agent 120. Auto-clipping agent 120 may extract frames from the video. In some embodiments, auto-clipping agent 120 may extract frames from the video at a low frame rate. An incremental PCA algorithm may be used by auto-clipping agent to select the top 120 components (e.g., frames) from the set of frames extracted by auto-clipping agent 120. Such operations may generate a video specific PCA model.

At set of operations 604, video data (e.g., broadcast video) may be provided to auto-clipping agent 120. Auto-clipping agent 120 may extract frames from the video. In some embodiments, auto-clipping agent 120 may extract frames from the video at a medium frame rate. The video specific PCA model may be used by auto-clipping agent 120 to compress the frames extracted by auto-clipping agent 120.

At set of operations 606, the compressed frames and a pre-selected number of desired clusters may be provided to auto-clipping agent 120. Auto-clipping agent 120 may utilize k-means clustering techniques to group the frames into one or more clusters, as set forth by the pre-selected number of desired clusters. Auto-clipping agent 120 may assign a cluster label to each compressed frames. Auto-clipping agent 120 may further be configured to classify each frame as trackable or untrackable. Auto-clipping agent 120 may label each respective frame as such.

At set of operations 608, auto-clipping agent 120 may analyze each cluster to determine if the cluster includes at least a threshold number of trackable frames. For example, as illustrated, if 80% of the frames of a cluster are classified as trackable, then auto-clipping agent 120 may consider the entire cluster as trackable. If, however, less than 80% of a cluster is classified as trackable, auto-clipping agent may determine if at least a second threshold number of frames in a cluster are trackable. For example, is illustrated if 70% of the frames of a cluster are classified as untrackable, auto-clipping agent 120 may consider the entire cluster trackable. If, however, less than 70% of the frames of the cluster are classified as untrackable, i.e., between 30% and 70% trackable, then human annotation may be requested.

Figure 7:
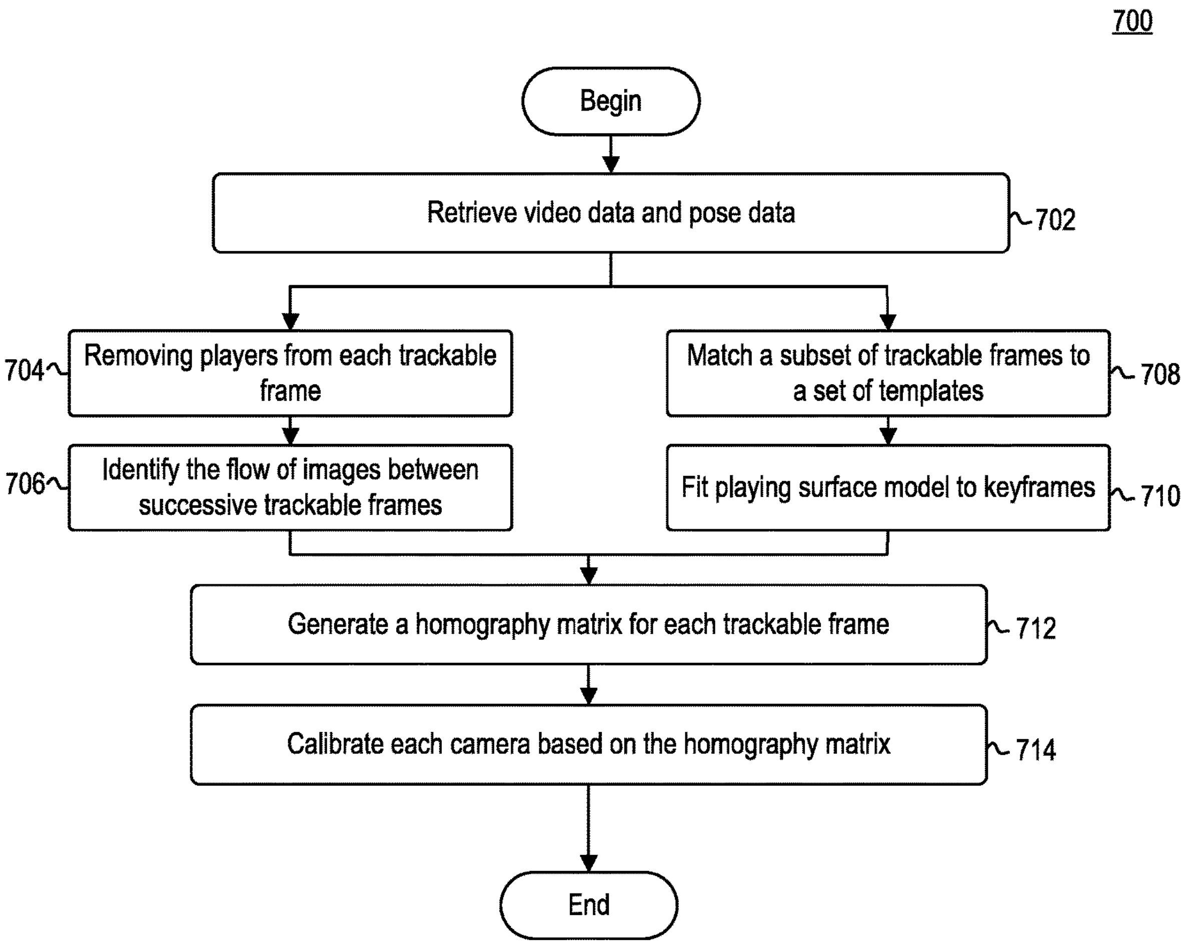
FIG. 7 is a flow diagram illustrating a method of calibrating a camera for each trackable frame, according to example embodiments.

FIG. 7 is a flow diagram illustrating a method 700 of calibrating a camera for each trackable frame, according to example embodiments. Method 700 may correspond to operation 408 discussed above in conjunction with FIG. 4. Method 700 may begin at step 702.

At step 702, organization computing system 104 may retrieve video data and pose data for analysis. For example, camera calibrator 124 may retrieve from database 205 the trackable frames for a given match and pose data for players in each trackable frame. Following step 702, camera calibrator 124 may execute two parallel processes to generate homography matrix for each frame. Accordingly, the following operations are not meant to be discussed as being performed sequentially, but may instead be performed in parallel or sequentially.

At step 704, organization computing system 104 may remove players from each trackable frame. For example, camera calibrator 124 may parse each trackable frame retrieved from database 205 to identify one or more players contained therein. Camera calibrator 124 may remove the players from each trackable frame using the pose data retrieved from database 205. For example, camera calibrator 124 may identify those pixels corresponding to pose data and remove the identified pixels from a given trackable frame.

At step 706, organization computing system 104 may identify the motion of objects (e.g., surfaces, edges, etc.) between successive trackable frames. For example, camera calibrator 124 may analyze successive trackable frames, with players removed therefrom, to determine the motion of objects from one frame to the next. In other words, optical flow module 226 may identify the flow field between successive trackable frames.

At step 708, organization computing system 104 may match an output from playing surface segmenter 216 to a set of templates. For example, camera calibrator 124 may match one or more frames in which the image of the playing surface is clear to one or more templates. Camera calibrator 124 may parse the set of trackable clips to identify those clips that provide a clear picture of the playing surface and the markings therein. Based on the selected clips, camera calibrator 124 may compare such images to playing surface templates. Each template may represent a different camera perspective of the playing surface. Those frames that are able to match to a given template are considered keyframes. In some embodiments, camera calibrator 124 may implement a neural network to match the one or more frames. In some embodiments, camera calibrator 124 may implement cross-correlation to match the one or more frames.

At step 710, organization computing system 104 may fit a playing surface model to each keyframe. For example, camera calibrator 124 may be configured to receive, as input, the identified keyframes. Camera calibrator 124 may implement a neural network to fit a playing surface model to segmentation information of the playing surface. By fitting the playing surface model to such output, camera calibrator 124 may generate homography matrices for each keyframe.

At step 712, organization computing system 104 may generate a homography matrix for each trackable frame. For example, camera calibrator 124 may utilize the flow fields identified in step 706 and the homography matrices for each key frame to generate a homography matrix for each frame. The homography matrix may be used to project the track or position of players into real-world coordinates. For example, given the geometric transform represented by the homography matrix, camera calibrator 124 may use his transform to project the location of players on the image to real-world coordinates on the playing surface.

At step 714, organization computing system 104 may calibrate each camera based on the homography matrix.

Figure 8:
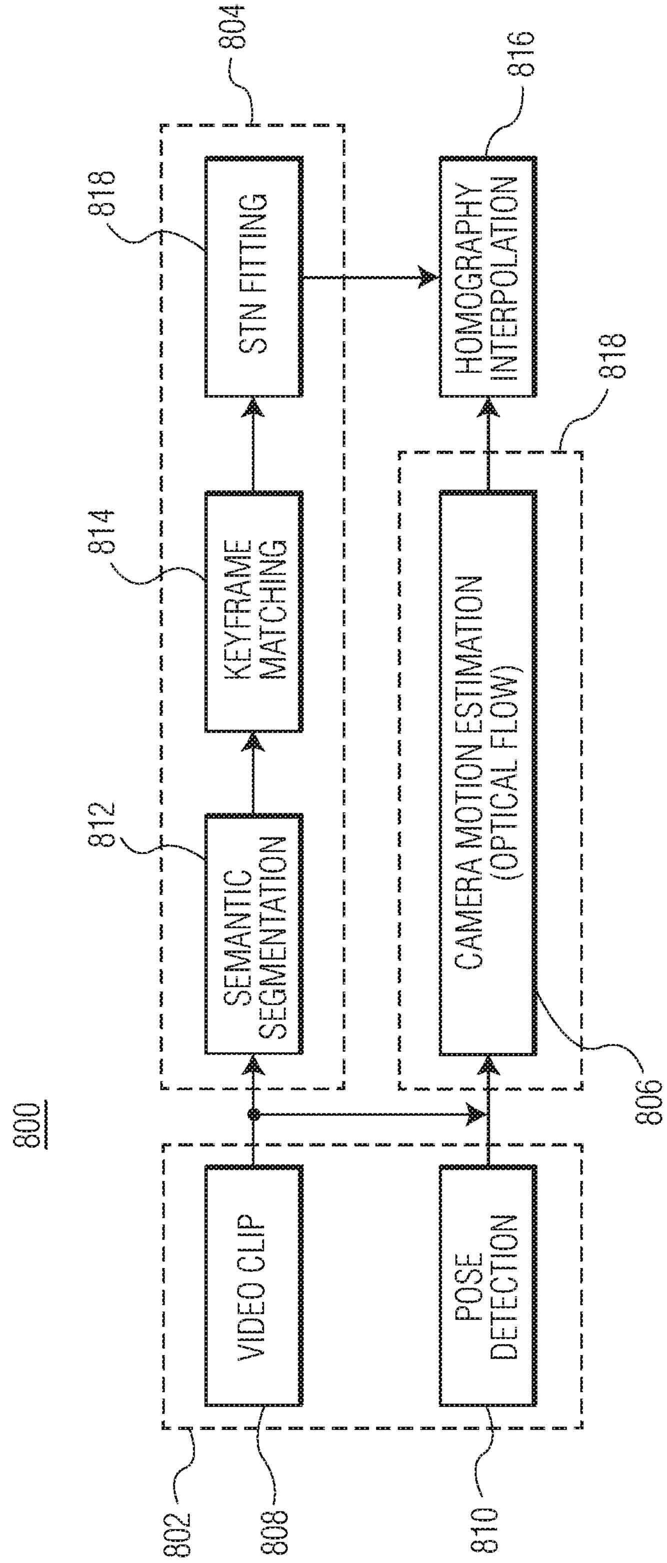
FIG. 8 is a block diagram illustrating aspects of operations discussed above in conjunction with FIG. 7, according to example embodiments.

FIG. 8 is a block diagram 800 illustrating aspects of operations discussed above in conjunction with method 700, according to example embodiments. As shown, block diagram 800 may include inputs 802, a first set of operations 804, and a second set of operations 806. First set of operations 804 and second set of operations 806 may be performed in parallel.

Inputs 802 may include video clips 808 and pose detection 810. In some embodiments, video clips 808 may correspond to trackable frames generated by auto-clipping agent 120. In some embodiments, pose detection 810 may correspond to pose data generated by pose detector 212. As illustrated, only video clips 808 may be provided as input to first set of operations 804; both video clips 804 and post detection 810 may be provided as input to second set of operations 806.

First set of operations 804 may include semantic segmentation 812, keyframe matching 814, and STN fitting 816. At semantic segmentation 812, playing surface segmenter 216 may be configured to identify playing surface markings in a broadcast feed. In some embodiments, playing surface segmenter 216 may be configured to utilize a neural network to identify playing surface markings. Such segmentation information may be performed in advance and provided to camera calibration 124 from database 215. At keyframe matching 814, keyframe matching module 224 may be configured to match one or more frames in which the image of the playing surface is clear to one or more templates. At STN fitting 816, STN 226 may implement a neural network to fit a playing surface model to segmentation information of the playing surface. By fitting the playing surface model to such output, STN 224 may generate homography matrices for each keyframe.

Second set of operations 806 may include camera motion estimation 818. At camera flow estimation 818, optical flow module 226 may be configured to identify the pattern of motion of objects from one trackable frame to another. For example, optical flow module 226 may use body pose information to remove players from the trackable frame information. Once removed, optical flow module 226 may determine the motion between frames to identify the motion of a camera between successive frames.

First set of operations 804 and second set of operations 806 may lead to homography interpolation 816. Optical flow module 226 and STN 224 may work in conjunction to generate a homography matrix for each trackable frame, such that a camera may be calibrated for each frame. The homography matrix may be used to project the track or position of players into real-world coordinates.

Figure 9:
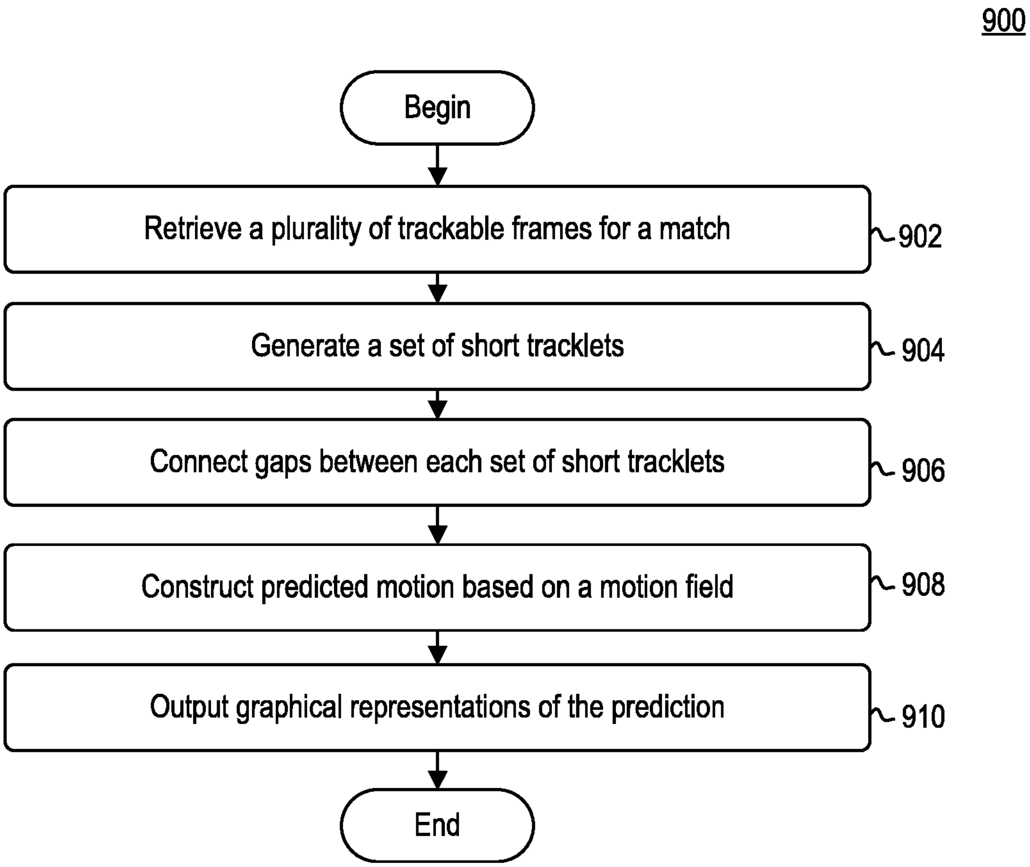
FIG. 9 is a flow diagram illustrating a method of tracking players, according to example embodiments.

FIG. 9 is a flow diagram illustrating a method 900 of tracking players, according to example embodiments. Method 900 may correspond to operation 410 discussed above in conjunction with FIG. 4. Method 900 may begin at step 902.

At step 902, organization computing system 104 may retrieve a plurality of trackable frames for a match. Each of the plurality of trackable frames may include one or more sets of metadata associated therewith. Such metadata may include, for example, body pose information and camera calibration data. In some embodiments, player tracking agent 126 may further retrieve broadcast video data.

At step 904, organization computing system 104 may generate a set of short tracklets. For example, player tracking agent 126 may match pairs of player patches, which may be derived from pose information, based on appearance and distance to generate a set of short tracklets. For example, let $$H_j^i$$

be the player patch of the $j^{th}$ player at time t, and let $$I_j^t = \{x_j^t,\ y_j^t,\ w_j^t,\ h_j^t\}$$

be the image coordinates $$x_j^t,\ y_j^t,$$

the width $$w_j^t,$$

and the height $$h_j^t$$

of the $j^{th}$ player at time t. Using this, player tracking agent 126 may associated any pair of detections using the appearance cross correlation $$C_{ij}^t = H_i^t * H_j^{t+1} \text{ and } L_{ij}^t = \|I_i^t - I_j^{t+1}\|_2^2$$

by finding:

$$\arg\max_{ij}(C_{ij}^t + L_{ij}^t)$$

Performing this for every pair may generate a set of short tracklets. The end points of these tracklets may then be associated with each other based on motion consistency and color histogram similarity.

For example, let $v_i$ be the extrapolated velocity from the end of the $i^{th}$ tracklet and $v_j$ be the velocity extrapolated from the beginning of the $j^{th}$ tracklet. Then $c_{ij}=v_i \cdot v_j$ may represent the motion consistency score. Furthermore, let $p(h)_i$ represent the likelihood of a color h being present in an image patch i. Player tracking agent 126 may measure the color histogram similarity using Bhattacharyya distance:

$$D_B(p_i,p_j)=-\ln(BC(p_i,p_j)) \text{ with } BC(p_i,p_j)=\Sigma_h\sqrt{p_i(h)p_j(h)}$$

At step 906, organization computing system 104 may connect gaps between each set of short tracklets. For example, recall that tracking agent 120 finds the matching pair of tracklets by finding:

$$\arg\max_{ij}(c_{ij} + D_B(p_i, p_j)).$$

Solving for every pair of broken tracklets may result in a set of clean tracklets, while leaving some tracklets with large, i.e., many frames, gaps. To connect the large gaps, player tracking agent 126 may augment affinity measures to include a motion field estimation, which may account for the change of player direction that occurs over many frames.

The motion field may be a vector field which measures what direction a player at a point on the playing surface x would be after some time A. For example, let $$X_i = \{x_i^t\}_{t\in(0,T)}$$

to be the court position of a player i at every time t. Then, there may exist a pair of points that have a displacement $$d_i^\lambda(x_i^t) = x_i^t - x_i^{t+1} \text{ if } \lambda < T.$$

Accordingly, the motion field may then be:

$$V(x, \lambda) = G(x, 5) * \sum_i d_i^\lambda(d_i^t),$$

where G(x, 5) may be a Gaussian kernel with standard deviation equal to about five feet. In other words, motion field may be a Gaussian blur of all displacements.

At step 908, organization computing system 104 may predict a motion of an agent based on the motion field. For example, player tracking system 126 may use a neural network (e.g., neural network 232) to predict player trajectories given ground truth player trajectory. Given a set of ground truth player trajectories $X_i$, player tracking agent 126 may be configured to generate the set $\hat{V}(x, \lambda)$, where $\hat{V}(x, \lambda)$ may be the predicted motion field. Player tracking agent 126 may train neural network 232 to reduce (e.g., minimize)

$$\|V(x, \lambda) - \hat{V}(x, \lambda)\|_2^2.$$

Player tracking agent 126 may then generate the affinity score for any tracking gap of size A by:

$$K_{ij}=V(x,\lambda)\cdot d_{ij}$$

where $$d_{ij} = x_i^t - x_j^{t+\lambda}$$

is the displacement vector between all broken tracks with a gap size of λ. Accordingly, player tracking agent 126 may solve for the matching pairs as recited above. For example, given the affinity score, player tracking agent 126 may assign every pair of broken tracks using a Hungarian algorithm. The Hungarian algorithm (e.g., Kuhn-Munchers) may optimize the best set of matches under a constraint that all pairs are to be matched.

At step 910, organization computing system 104 may output a graphical representation of the prediction. For example, interface agent 128 may be configured to generate one or more graphical representations corresponding to the tracks for each player generated by player tracking agent 126. For example, interface agent 128 may be configured to generate one or more graphical user interfaces (GUIs) that include graphical representations of player tracking each prediction generated by player tracking agent 126.

In some situations, during the course of a match, players or agents have the tendency to wander outside of the point-of-view of camera. Such issue may present itself during an injury, lack of hustle by a player, quick turnover, quick transition from offense to defense, and the like. Accordingly, a player in a first trackable frame may no longer be in a successive second or third trackable frame. Player tracking agent 126 may address this issue via re-identification agent 234.

Figure 10:
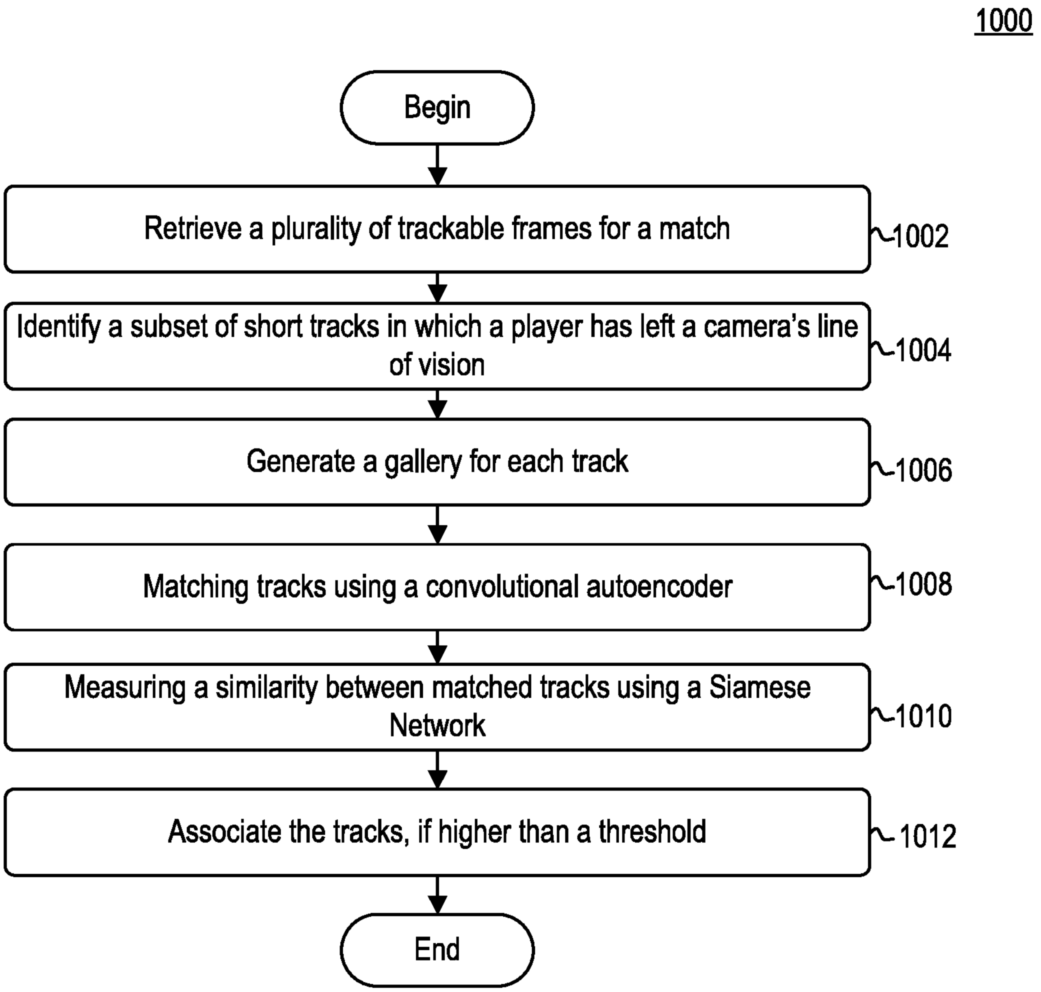
FIG. 10 is a flow diagram illustrating a method of tracking players, according to example embodiments.

FIG. 10 is a flow diagram illustrating a method 1000 of tracking players, according to example embodiments. Method 1000 may correspond to operation 410 discussed above in conjunction with FIG. 4. Method 1000 may begin at step 1002.

At step 1002, organization computing system 104 may retrieve a plurality of trackable frames for a match. Each of the plurality of trackable frames may include one or more sets of metadata associated therewith. Such metadata may include, for example, body pose information and camera calibration data. In some embodiments, player tracking agent 126 may further retrieve broadcast video data.

At step 1004, organization computing system 104 may identify a subset of short tracks in which a player has left the camera's line of vision. Each track may include a plurality of image patches associated with at least one player. An image patch may refer to a subset of a corresponding frame of a plurality of trackable frames. In some embodiments, each track X may include a player identity label y. In some embodiments, each player patch l in a given track X may include pose information generated by data set generator 122. For example, given an input video, pose detection, and trackable frames, re-identification agent 234 may generate a track collection that includes a lot of short broken tracks of players.

At step 1006, organization computing system 104 may generate a gallery for each track. For example, given those small tracks, re-identification agent 234 may build a gallery for each track. Re-identification agent 234 may build a gallery for each track where the jersey number of a player (or some other static feature) is always visible. The body pose information generated by data set generator 122 allows re-identification agent 234 to determine each player's orientation. For example, re-identification agent 234 may utilize a heuristic method, which may use the normalized shoulder width to determine the orientation:

$$S_{orient} = \frac{\|l_{Lshoulder} - l_{Rshoulder}\|_2}{\|l_{Neck} - l_{Hi}\|_2}$$

where l may represent the location of one body part. The width of shoulder may be normalized by the length of the torso so that the effect of scale may be eliminated. As two shoulders should be apart when a player faces towards or backwards from the camera, re-identification agent 234 may use those patches whose $S_{orient}$ is larger than a threshold to build the gallery. Accordingly, each track $X_n$, may include a gallery:

$$G_n = \{l_i | S_{orient,i} > \text{thresh}\} \forall l_i \in X_n$$

At step 1008, organization computing system 104 may match tracks using a convolutional autoencoder. For example, re-identification agent 234 may use conditional autoencoder (e.g., conditional autoencoder 240) to identify one or more features in each track. For example, unlike conventional approaches to re-identification issues, players in team sports may have very similar appearance features, such as clothing style, clothing color, and skin color. One of the more intuitive differences may be the jersey number that may be shown at the front and/or back side of each jersey. In order to capture those specific features, re-identification agent 234 may train conditional autoencoder to identify such features.

In some embodiments, conditional autoencoder may be a three-layer convolutional autoencoder, where the kernel sizes may be 3×3 for all three layers, in which there are 64, 128, 128 channels respectively. Those hyper-parameters may be tuned to ensure that jersey number may be recognized from the reconstructed images so that the desired features may be learned in the autoencoder. In some embodiments, $f(l_i)$ may be used to denote the features that are learned from image i.

Using a specific example, re-identification agent 234 may identify a first track that corresponds to a first player. Using conditional autoencoder 240, re-identification agent 234 may learn a first set of jersey features associated with the first track, based on for example, a first set of image patches included or associated with the first track. Re-identification agent 234 may further identify a second track that may initially correspond to a second player. Using conditional autoencoder 240, re-identification agent 234 may learn a second set of jersey features associated with the second track, based on, for example, a second set of image patches included or associated with the second track.

At step 1010, organization computing system 104 may measure a similarity between matched tracks using a Siamese network. For example, re-identification agent 234 may train Siamese network (e.g., Siamese network 242) to measure the similarity between two image patches based on their feature representations f(l). Given two image patches, their feature representations $f(l_i)$ and $f(l_j)$ may be flattened, connected, and fed into a perception network. In some embodiments, $L_2$ norm may be used to connect the two sub-networks of $f(l_i)$ and $f(l_j)$. In some embodiments, perception network may include three layers, which include 1024, 512, and 216 hidden units, respectively. Such network may be used to measure the similarity $s(l_i,l_j)$ between every pair of image patches of the two tracks that have no time overlapping. In order to increase the robustness of the prediction, the final similarity score of the two tracks may be the average of all pairwise scores in their respective galleries.

$$S(x_n, x_m) = \frac{1}{|G_n||G_m|} \sum_{i \in G_n, j \in G_m} s(l_i, l_j)$$

Continuing with the aforementioned example, re-identification agent 234 may utilize Siamese network 242 to compute a similarity score between the first set of learned jersey features and the second set of learned jersey features.

At step 1012, organization computing system 104 may associate the tracks, if their similarity score is higher than a predetermined threshold. For example, re-identification agent 234 may compute a similarity score be computed for every two tracks that do not have time overlapping. If the score is higher than some threshold, re-identification agent 234 may associate those two tracks may.

Continuing with the above example, re-identification agent 234 may associated with first track and the second track if, for example, the similarity score generated by Siamese network 242 is at least higher than a threshold value. Assuming the similarity score is higher than the threshold value, re-identification agent 234 may determine that the first player in the first track and the second player in the second track are indeed one in the same.

Figure 11:
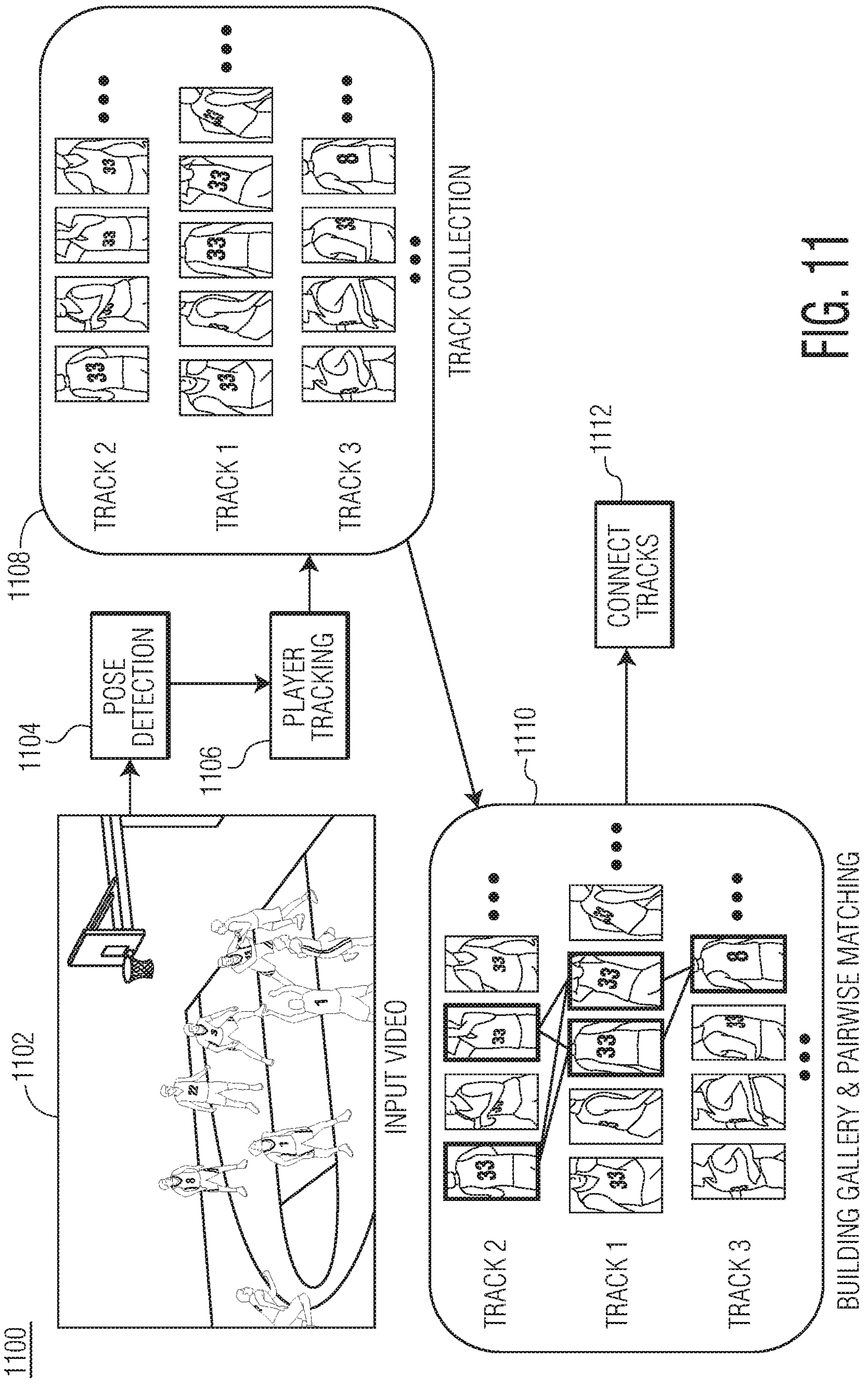
FIG. 11 is a block diagram illustrating aspects of operations discussed above in conjunction with FIG. 10, according to example embodiments.

FIG. 11 is a block diagram 1100 illustrating aspects of operations discussed above in conjunction with method 1000, according to example embodiments.

As shown block diagram 1100 may include input video 1102, pose detection 1104, player tracking 1106, track collection 1108, gallery building and pairwise matching 1110, and track connection 1112. Block diagram 1100 illustrates a general pipeline of method 1000 provided above.

Given input video 1102, pose detection information 1104 (e.g., generated by pose detector 212), and player tracking information 1106 (e.g., generated by one or more of player tracking agent 126, auto-clipping agent 120, and camera calibrator 124), re-identification agent 234 may generate track collection 1108. Each track collection 1108 may include a plurality of short broken tracks (e.g., track 1114) of players. Each track 1114 may include one or more image patches 1116 contained therein. Given the tracks 1114, re-identification agent 234 may generate a gallery 1110 for each track. For example, gallery 1110 may include those image patches 1118 in a given track that include an image of a player in which their orientation satisfies a threshold value. In other words, re-identification agent 234 may generate gallery 1110 for each track 1114 that includes image patches

1118 of each player, such that the player's number may be visible in each frame. Image patches 1118 may be a subset of image patches 1116. Re-identification agent 234 may then pairwise match each frame to compute a similarity score via Siamese network. For example, as illustrated, re-identification agent 234 may match a first frame from track 2 with a second frame from track 1 and feed the frames into Siamese network.

Re-identification agent 234 may then connect tracks 1112 based on the similarity scores. For example, if the similarity score of two frames exceed some threshold, re-identification agent 234 may connect or associate those tracks.

Figure 12:
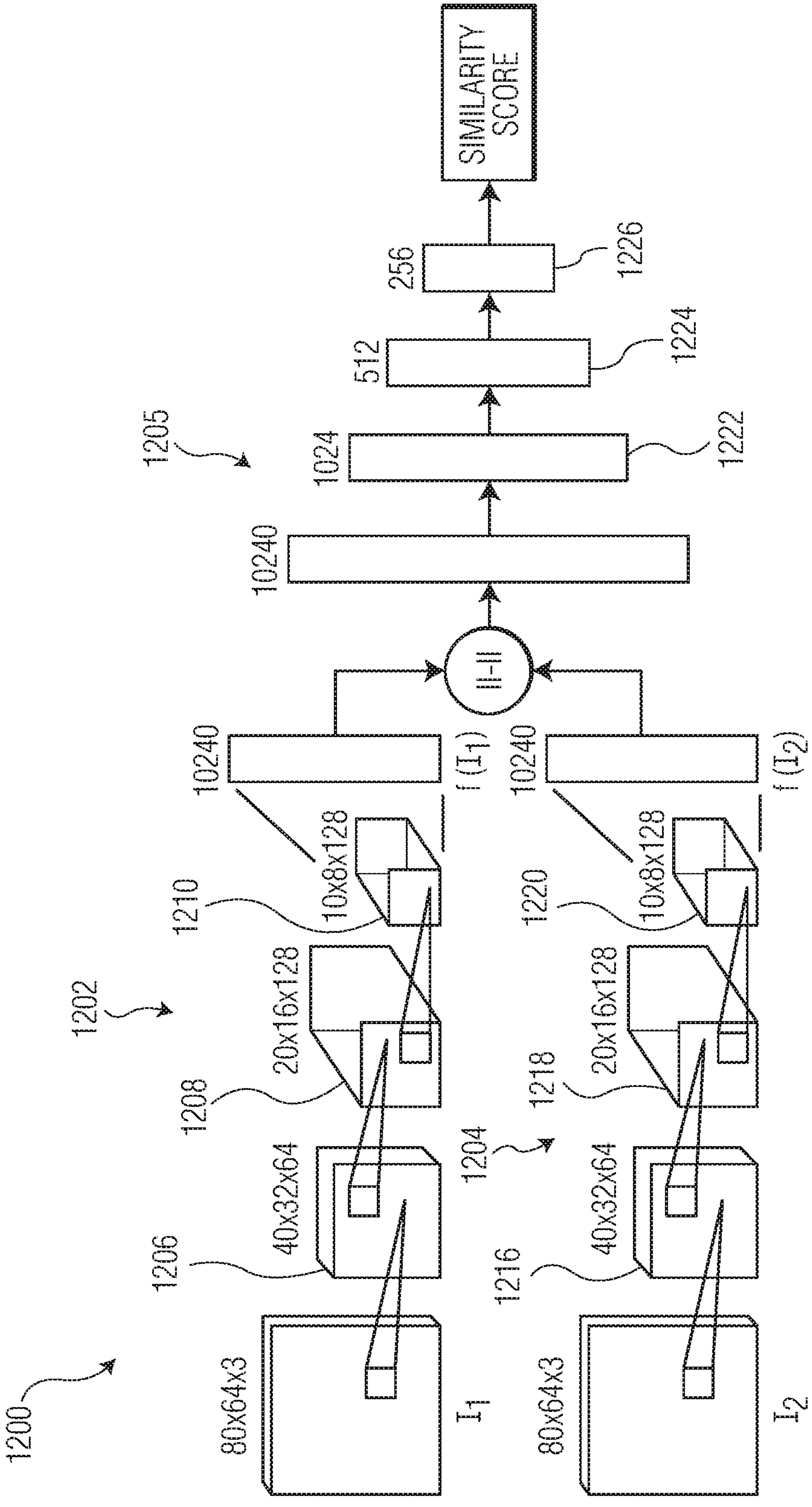
FIG. 12 is a block diagram illustrating architecture of re-identification agent, according to example embodiments.

FIG. 12 is a block diagram illustrating architecture 1200 of Siamese network 242 of re-identification agent 234, according to example embodiments. As illustrated, Siamese network 242 may include two sub-networks 1202, 1204, and a perception network 1205.

Each of two sub-networks 1202, 1204 may be configured similarly. For example, sub-network 1202 may include a first convolutional layer 1206, a second convolutional layer 1208, and a third convolutional layer 1210. First sub-network 1202 may receive, as input, a player patch $l_1$ and output a set of features learned from player patch $l_1$ (denoted $f(l_1)$). Sub-network 1204 may include a first convolutional layer 1216, a second convolutional layer 1218, and a third convolutional layer 1220. Second sub-network 1204 may receive, as input, a player patch $l_2$ and may output a set of features learned from player patch $l_2$ (denoted $f(l_2)$). The output from sub-network 1202 and sub-network 1204 may be an encoded representation of the respective player patches $l_1$, $l_2$. In some embodiments, the output from sub-network 1202 and sub-network 1204 may be followed by a flatten operation, which may generate respective feature vectors $f(l_1)$ and $f(l_2)$, respectively. In some embodiments, each feature vector $f(l_1)$ and $f(l_2)$ may include 10240 units. In some embodiments, the L2 norm of $f(l_1)$ and $f(l_2)$ may be computed and used as input to perception network 1205.

Perception network 1205 may include three layers 1222-1226. In some embodiments, layer 1222 may include 1024 hidden units. In some embodiments, layer 1224 may include 512 hidden units. In some embodiments, layer 1226 may include 256 hidden units. Perception network 1205 may output a similarity score between image patches $l_1$ and $l_2$.

Figure 13A:
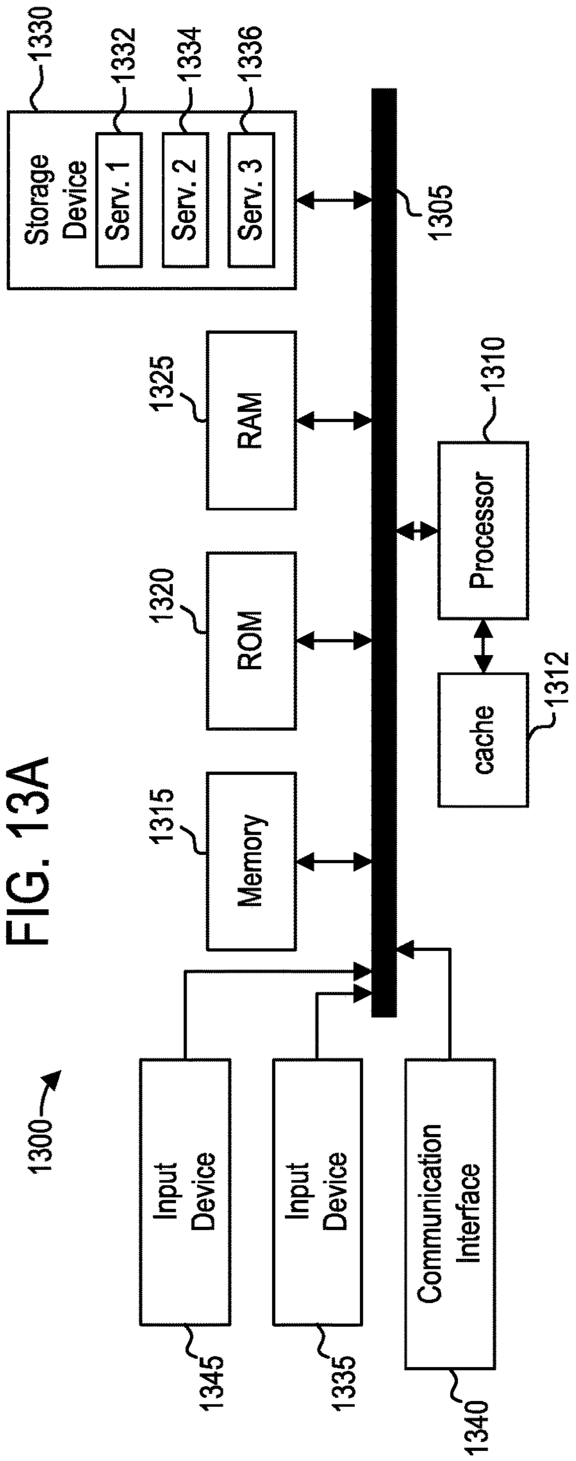
FIG. 13A is a block diagram illustrating a computing device, according to example embodiments.

FIG. 13A illustrates a system bus computing system architecture 1300, according to example embodiments. System 1300 may be representative of at least a portion of organization computing system 104. One or more components of system 1300 may be in electrical communication with each other using a bus 1305. System 1300 may include a processing unit (CPU or processor) 1310 and a system bus 1305 that couples various system components including the system memory 1315, such as read only memory (ROM) 1320 and random access memory (RAM) 1325, to processor 1310. System 1300 may include a cache of high-speed memory connected directly with, in close proximity to, or integrated as part of processor 1310. System 1300 may copy data from memory 1315 and/or storage device 1330 to cache 1312 for quick access by processor 1310. In this way, cache 1312 may provide a performance boost that avoids processor 1310 delays while waiting for data. These and other modules may control or be configured to control processor 1310 to perform various actions. Other system memory 1315 may be available for use as well. Memory 1315 may include multiple different types of memory with different performance characteristics. Processor 1310 may include any general purpose processor and a hardware module or software module, such as service 1 1332, service 2 1334, and service 3 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 may represent any number of input mechanisms, such as a microphone for speech, a touch-sensitive screen for gesture or graphical input, keyboard, mouse, motion input, speech and so forth. An output device 1335 may also be one or more of a number of output mechanisms known to those of skill in the art. In some instances, multimodal systems may enable a user to provide multiple types of input to communicate with computing device 1300. Communications interface 1340 may generally govern and manage the user input and system output. There is no restriction on operating on any particular hardware arrangement and therefore the basic features here may easily be substituted for improved hardware or firmware arrangements as they are developed.

Storage device 1330 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1325, read only memory (ROM) 1320, and hybrids thereof.

Storage device 1330 may include services 1332, 1334, and 1336 for controlling the processor 1310. Other hardware or software modules are contemplated. Storage device 1330 may be connected to system bus 1305. In one aspect, a hardware module that performs a particular function may include the software component stored in a computer-readable medium in connection with the necessary hardware components, such as processor 1310, bus 1305, display 1335, and so forth, to carry out the function.

Figure 13B:
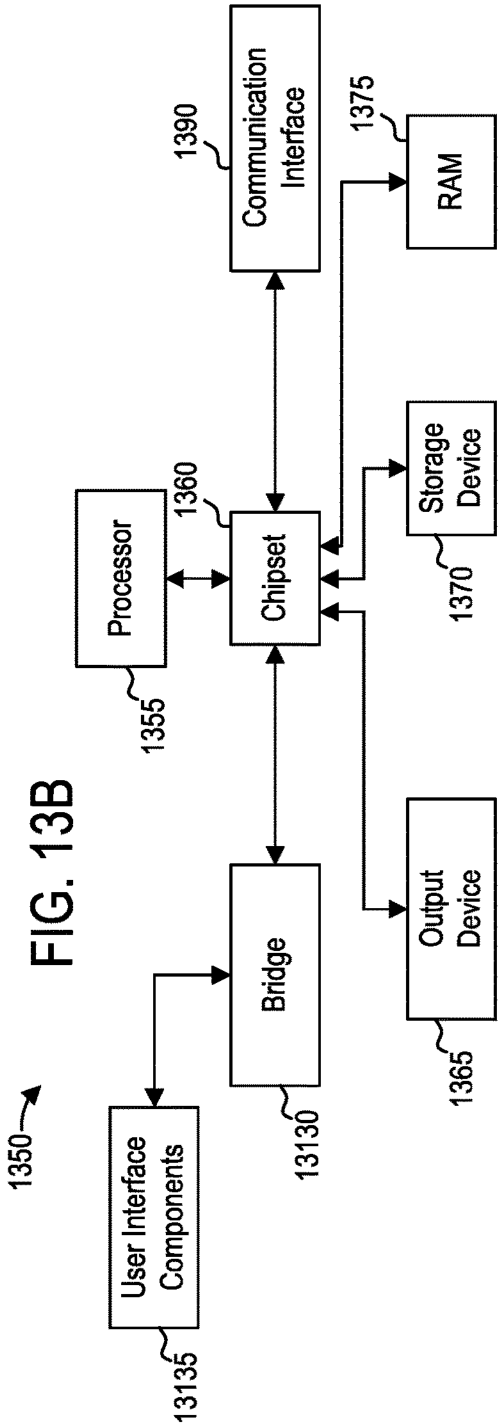
FIG. 13B is a block diagram illustrating a computing device, according to example embodiments.

FIG. 13B illustrates a computer system 1350 having a chipset architecture that may represent at least a portion of organization computing system 104. Computer system 1350 may be an example of computer hardware, software, and firmware that may be used to implement the disclosed technology. System 1350 may include a processor 1355, representative of any number of physically and/or logically distinct resources capable of executing software, firmware, and hardware configured to perform identified computations. Processor 1355 may communicate with a chipset 1360 that may control input to and output from processor 1355. In this example, chipset 1360 outputs information to output 1365, such as a display, and may read and write information to storage device 1370, which may include magnetic media, and solid state media, for example. Chipset 1360 may also read data from and write data to RAM 1375. A bridge 1380 for interfacing with a variety of user interface components 1385 may be provided for interfacing with chipset 1360. Such user interface components 1385 may include a keyboard, a microphone, touch detection and processing circuitry, a pointing device, such as a mouse, and so on. In general, inputs to system 1350 may come from any of a variety of sources, machine generated and/or human generated.

Chipset 1360 may also interface with one or more communication interfaces 1390 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1355 analyzing data stored in storage 1370 or 1375. Further, the machine may receive inputs from a user through user interface components 1385 and execute appropriate functions, such as browsing functions by interpreting these inputs using processor 1355.

It may be appreciated that example systems 1300 and 1350 may have more than one processor 1310 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method for predicting a player track, the method comprising:

receiving, by a computing system, a plurality of frames from a database, wherein the plurality of frames capture a view of a sporting event;

generating, by the computing system, a plurality of data sets from the plurality of frames, wherein the generating includes identifying pose data of at least one player in the plurality of frames;

calibrating, by the computing system, a camera in each of the plurality of frames based on the plurality of data sets and the pose data, wherein the calibrating includes:

removing, based on the pose data, one or more pixels corresponding to the at least one player from at least one of the plurality of frames;

identifying a flow field between at least two successive frames of the plurality of frames with the one or more removed pixels;

generating a homography matrix for each keyframe; and generating a frame homography matrix for each frame based on the homography matrix and the flow field; and predicting, by the computing system, a track for each player based on the plurality of data sets and the calibrated camera.

2. The method of claim 1, wherein calibrating the camera in each of the plurality of frames based on the plurality of data sets further comprises:

identifying, by the computing system, a frame subset of the plurality of frames that provide a clear image of a playing surface;

comparing, by the computing system, the frame subset to a plurality of playing surface templates that include a different camera perspective of the playing surface; and based on the comparing, identifying, by the computing system, a frame of the frame subset that matches a playing surface template as a keyframe.

3. The method of claim 2, wherein comparing the frame subset to the plurality of playing surface templates includes utilizing a neural network to perform the comparing.

4. The method of claim 1, wherein calibrating the camera in each of the plurality of frames based on the plurality of data sets further comprises:

calibrating, by the computing system, the camera based on the frame homography matrix.

5. The method of claim 1, wherein the plurality of data sets include player location information, ball location information, and portions of a court corresponding to the plurality of frames.

6. The method of claim 1, the method further comprising:

displaying, by the computing system, a graphical representation corresponding to each predicted track on one or more graphical user interfaces.

7. The method of claim 1, wherein the track for each player includes a set of real-world coordinates on a playing surface.

8. The method of claim 1, wherein the flow field identifies a motion of the camera between the at least two successive frames of the plurality of frames with the one or more removed pixels.

9. A computer system for predicting a player track, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving a plurality of frames from a database, wherein the plurality of frames capture a view of a sporting event;

generating a plurality of data sets from the plurality of frames, wherein the generating includes identifying pose data of at least one player in the plurality of frames;

calibrating a camera in each of the plurality of frames based on the plurality of data sets and the pose data, wherein the calibrating includes:

removing, based on the pose data, one or more pixels corresponding to the at least one player from at least one of the plurality of frames;

identifying a flow field between at least two successive frames of the plurality of frames with the one or more removed pixels;

generating a homography matrix for each keyframe; and generating a frame homography matrix for each frame based on the homography matrix and the flow field; and predicting a track for each player based on the plurality of data sets and the calibrated camera.

10. The computer system of claim 9, wherein calibrating the camera in each of the plurality of frames based on the plurality of data sets further comprises:

identifying a frame subset of the plurality of frames that provide a clear image of a playing surface;

comparing the frame subset to a plurality of playing surface templates that include a different camera perspective of the playing surface; and based on the comparing, identifying a frame of the frame subset that matches a playing surface template as a keyframe.

11. The computer system of claim 10, wherein comparing the frame subset to the plurality of playing surface templates includes utilizing a neural network to perform the comparing.

12. The computer system of claim 9, wherein calibrating the camera in each of the plurality of frames based on the plurality of data sets further comprises:

calibrating the camera based on the frame homography matrix.

13. The computer system of claim 9, wherein the plurality of data sets include player location information, ball location information, and portions of a court corresponding to the plurality of frames.

14. The computer system of claim 9, the functions further comprising:

displaying a graphical representation corresponding to each predicted track on one or more graphical user interfaces.

15. The computer system of claim 9, wherein the flow field identifies a motion of the camera between the at least two successive frames of the plurality of frames with the one or more removed pixels.

16. A non-transitory computer-readable medium containing instructions for generating a player tracking prediction, the instructions comprising:

receiving, by a computing system, a plurality of frames from a database, wherein the plurality of frames capture a view of a sporting event;

generating, by the computing system, a plurality of data sets from the plurality of frames, wherein the generating includes identifying pose data of at least one player in the plurality of frames;

calibrating, by the computing system, a camera in each of the plurality of frames based on the plurality of data sets and the pose data, wherein the calibrating includes:

removing, based on the pose data, one or more pixels corresponding to the at least one player from at least one of the plurality of frames;

identifying a flow field between at least two successive frames of the plurality of frames with the one or more removed pixels;

generating a homography matrix for each keyframe; and generating a frame homography matrix for each frame based on the homography matrix and the flow field; and predicting, by the computing system, a track for each player based on the plurality of data sets and the calibrated camera.

17. The non-transitory computer-readable medium of claim 16, wherein calibrating the camera in each of the plurality of frames based on the plurality of data sets further comprises:

identifying, by the computing system, a frame subset of the plurality of frames that provide a clear image of a playing surface;

comparing, by the computing system, the frame subset to a plurality of playing surface templates that include a different camera perspective of the playing surface; and based on the comparing, identifying, by the computing system, a frame of the frame subset that matches a playing surface template as a keyframe.

18. The non-transitory computer-readable medium of claim 17, wherein comparing the frame subset to the plurality of playing surface templates includes utilizing a neural network to perform the comparing.

19. The non-transitory computer-readable medium of claim 16, wherein calibrating the camera in each of the plurality of frames based on the plurality of data sets further comprises:

calibrating, by the computing system, the camera based on the frame homography matrix.

20. The non-transitory computer-readable medium of claim 16, wherein the flow field identifies a motion of the camera between the at least two successive frames of the plurality of frames with the one or more removed pixels.

* * * * *